United States Patent
Lehmann et al.

(10) Patent No.: US 11,500,538 B2
(45) Date of Patent: Nov. 15, 2022

(54) KEYLESS KEYBOARD WITH FORCE SENSING AND HAPTIC FEEDBACK

(71) Applicant: Apple Inc., Cupertino, CA (US)

(72) Inventors: Alex J. Lehmann, Sunnyvale, CA (US); Chang Zhang, San Jose, CA (US); Dayu Qu, Cupertino, CA (US); Kenneth M. Silz, Brentwood, CA (US); Paul X. Wang, Cupertino, CA (US); Qiliang Xu, Livermore, CA (US); Zheng Gao, Sunnyvale, CA (US); Scott J. McEuen, Morgan Hill, CA (US); Reza Nasiri Mahalati, Belmont, CA (US)

(73) Assignee: Apple Inc., Cupertino, CA (US)

( * ) Notice: Subject to any disclaimer, the term of this patent is extended or adjusted under 35 U.S.C. 154(b) by 457 days.

(21) Appl. No.: 15/692,810

(22) Filed: Aug. 31, 2017

(65) Prior Publication Data

US 2018/0074694 A1    Mar. 15, 2018

Related U.S. Application Data

(60) Provisional application No. 62/393,989, filed on Sep. 13, 2016.

(51) Int. Cl.
    *G06F 3/04886* (2022.01)
    *G06F 3/01* (2006.01)
    *G06F 3/04883* (2022.01)

(52) U.S. Cl.
    CPC ......... *G06F 3/04886* (2013.01); *G06F 3/016* (2013.01); *G06F 3/04883* (2013.01);
    (Continued)

(58) Field of Classification Search
    USPC ....................................................... 715/702
    See application file for complete search history.

(56) References Cited

U.S. PATENT DOCUMENTS 3,657,492 A    4/1972    Arndt et al.
3,917,917 A    11/1975   Murata
(Continued)

FOREIGN PATENT DOCUMENTS

CN    2155620    2/1994
CN    2394309    8/2000
(Continued)

OTHER PUBLICATIONS

Elekson, "Reliable and Tested Wearable Electronics Embedment Solutions," http://www.wearable.technology/our-technologies, 3 pages, at least as early as Jan. 6, 2016.

*Primary Examiner* — Sherief Badawi
*Assistant Examiner* — Conrad R Pack
(74) *Attorney, Agent, or Firm* — Brownstein Hyatt Farber Schreck, LLP

(57) ABSTRACT

An input device for an electronic device includes an enclosure and a top member defining an input surface having multiple differentiated input regions. The input device further includes a first force sensing system associated with a first area of the top member and including a first group of the differentiated input regions, and a second force sensing system associated with a second area of the top member and including a second group of the differentiated input regions. The input device further includes a touch sensing system configured to determine which input region from the first group of the differentiated input regions corresponds to the first force input and to determine which input region from the second group of the differentiated input regions corresponds to the second force input.

21 Claims, 22 Drawing Sheets

(52) U.S. Cl.
CPC .............. *G06F 2203/04104* (2013.01); *G06F 2203/04105* (2013.01); *G06F 2203/04803* (2013.01)

(56) References Cited

U.S. PATENT DOCUMENTS

| | | | |
|---|---|---|---|
| 3,978,297 A | 8/1976 | Lynn et al. | |
| 4,095,066 A | 6/1978 | Harris | |
| 4,319,099 A | 3/1982 | Asher | |
| 4,349,712 A | 9/1982 | Michalski | |
| 4,484,042 A | 11/1984 | Matsui | |
| 4,596,905 A | 6/1986 | Fowler | |
| 4,598,181 A | 7/1986 | Selby | |
| 4,670,084 A | 6/1987 | Durand et al. | |
| 4,755,645 A | 7/1988 | Naoki et al. | |
| 4,937,408 A | 6/1990 | Hattori et al. | |
| 4,987,275 A | 1/1991 | Miller et al. | |
| 5,021,638 A | 6/1991 | Nopper et al. | |
| 5,092,459 A | 3/1992 | Uljanic et al. | |
| 5,136,131 A | 8/1992 | Komaki | |
| 5,278,372 A | 1/1994 | Takagi et al. | |
| 5,280,146 A | 1/1994 | Inagaki et al. | |
| 5,340,955 A | 8/1994 | Calvillo et al. | |
| 5,382,762 A | 1/1995 | Mochizuki | |
| 5,397,867 A | 3/1995 | Demeo | |
| 5,408,060 A | 4/1995 | Muurinen | |
| 5,421,659 A | 6/1995 | Liang | |
| 5,422,447 A | 6/1995 | Spence | |
| 5,457,297 A | 10/1995 | Chen | |
| 5,477,430 A | 12/1995 | LaRose et al. | |
| 5,481,074 A | 1/1996 | English | |
| 5,504,283 A | 4/1996 | Kako et al. | |
| 5,512,719 A | 4/1996 | Okada et al. | |
| 5,625,532 A | 4/1997 | Sellers | |
| 5,804,780 A | 9/1998 | Bartha | |
| 5,828,015 A | 10/1998 | Coulon | |
| 5,847,337 A | 12/1998 | Chen | |
| 5,874,700 A | 2/1999 | Hochgesang | |
| 5,875,013 A | 2/1999 | Takahara | |
| 5,876,106 A | 3/1999 | Kordecki et al. | |
| 5,878,872 A | 3/1999 | Tsai | |
| 5,881,866 A | 3/1999 | Miyajima et al. | |
| 5,898,147 A | 4/1999 | Domzaiski et al. | |
| 5,924,555 A | 7/1999 | Sadamori et al. | |
| 5,935,691 A | 8/1999 | Tsai | |
| 5,960,942 A | 10/1999 | Thornton | |
| 5,986,227 A | 11/1999 | Hon | |
| 6,020,565 A | 2/2000 | Pan | |
| 6,068,416 A | 5/2000 | Kumamoto et al. | |
| 6,215,420 B1 | 4/2001 | Harrison et al. | |
| 6,257,782 B1 | 7/2001 | Maruyama et al. | |
| 6,259,046 B1 | 7/2001 | Iwama et al. | |
| 6,377,685 B1 | 4/2002 | Krishnan | |
| 6,388,219 B2 | 5/2002 | Hsu et al. | |
| 6,423,918 B1 | 7/2002 | King et al. | |
| 6,482,032 B1 | 11/2002 | Szu et al. | |
| 6,530,283 B2 | 3/2003 | Okada et al. | |
| 6,538,801 B2 | 3/2003 | Jacobson et al. | |
| 6,542,355 B1 | 4/2003 | Huang | |
| 6,552,287 B2 | 4/2003 | Janniere | |
| 6,556,112 B1 | 4/2003 | Van Zeeland et al. | |
| 6,559,399 B2 | 5/2003 | Hsu et al. | |
| 6,560,612 B1 | 5/2003 | Yamada et al. | |
| 6,563,435 B1 | 5/2003 | Platz | |
| 6,572,289 B2 | 6/2003 | Lo et al. | |
| 6,573,463 B2 | 6/2003 | Ono | |
| 6,585,435 B2 | 7/2003 | Fang | |
| 6,624,369 B2 | 9/2003 | Ito et al. | |
| 6,706,986 B2 | 3/2004 | Hsu | |
| 6,738,050 B2 | 5/2004 | Comiskey | |
| 6,750,414 B2 | 6/2004 | Sullivan | |
| 6,759,614 B2 | 7/2004 | Yoneyama | |
| 6,762,381 B2 | 7/2004 | Kunthady et al. | |
| 6,765,503 B1 | 7/2004 | Chan et al. | |
| 6,788,450 B2 | 9/2004 | Kawai et al. | |
| 6,797,906 B2 | 9/2004 | Ohashi | |
| 6,850,227 B2 | 2/2005 | Takahashi et al. | |
| 6,860,660 B2 | 3/2005 | Hochgesang et al. | |
| 6,911,608 B2 | 6/2005 | Levy | |
| 6,926,418 B2 | 8/2005 | Ostergård et al. | |
| 6,940,030 B2 | 9/2005 | Takeda et al. | |
| 6,977,352 B2 | 12/2005 | Oosawa | |
| 6,979,792 B1 | 12/2005 | Lai | |
| 6,987,466 B1 | 1/2006 | Welch et al. | |
| 6,987,503 B2 | 1/2006 | Inoue | |
| 7,012,206 B2 | 3/2006 | Oikawa | |
| 7,030,330 B2 | 4/2006 | Suda | |
| 7,038,832 B2 | 5/2006 | Kanbe | |
| 7,126,499 B2 | 10/2006 | Lin et al. | |
| 7,129,930 B1 | 10/2006 | Cathey et al. | |
| 7,134,205 B2 | 11/2006 | Bruennel | |
| 7,146,701 B2 | 12/2006 | Mahoney et al. | |
| 7,151,236 B2 | 12/2006 | Ducruet et al. | |
| 7,151,237 B2 | 12/2006 | Mahoney et al. | |
| 7,154,059 B2 | 12/2006 | Chou | |
| 7,161,084 B2 | 1/2007 | Sandbach | |
| 7,166,813 B2 | 1/2007 | Soma | |
| 7,172,303 B2 | 2/2007 | Shipman et al. | |
| 7,189,932 B2 | 3/2007 | Kim | |
| 7,256,766 B2 | 8/2007 | Albert et al. | |
| 7,283,119 B2 | 10/2007 | Kishi | |
| 7,301,113 B2 | 11/2007 | Nishimura et al. | |
| 7,312,790 B2 | 12/2007 | Sato et al. | |
| 7,378,607 B2 | 5/2008 | Koyano et al. | |
| 7,385,806 B2 | 6/2008 | Liao | |
| 7,391,555 B2 | 6/2008 | Albert et al. | |
| 7,414,213 B2 | 8/2008 | Hwang | |
| 7,429,707 B2 | 9/2008 | Yanai et al. | |
| 7,432,460 B2 | 10/2008 | Clegg | |
| 7,510,342 B2 | 3/2009 | Lane et al. | |
| 7,531,764 B1 | 5/2009 | Lev et al. | |
| 7,541,554 B2 | 6/2009 | Hou | |
| 7,589,292 B2 | 9/2009 | Jung et al. | |
| 7,639,187 B2 | 12/2009 | Caballero et al. | |
| 7,639,571 B2 | 12/2009 | Ishii et al. | |
| 7,651,231 B2 | 1/2010 | Chou et al. | |
| 7,679,010 B2 | 3/2010 | Wingett | |
| 7,724,415 B2 | 5/2010 | Yamaguchi | |
| 7,781,690 B2 | 8/2010 | Ishii | |
| 7,813,774 B2 | 10/2010 | Perez-Noguera | |
| 7,842,895 B2 | 11/2010 | Lee | |
| 7,847,204 B2 | 12/2010 | Tsai | |
| 7,851,819 B2 | 12/2010 | Shi | |
| 7,866,866 B2 | 1/2011 | Wahlstrom | |
| 7,893,376 B2 | 2/2011 | Chen | |
| 7,923,653 B2 | 4/2011 | Ohsumi | |
| 7,947,915 B2 | 5/2011 | Lee et al. | |
| 7,999,748 B2 | 8/2011 | Ligtenberg et al. | |
| 8,063,325 B2 | 11/2011 | Sung et al. | |
| 8,077,096 B2 | 12/2011 | Chiang et al. | |
| 8,080,744 B2 | 12/2011 | Yeh et al. | |
| 8,098,228 B2 | 1/2012 | Shimodaira et al. | |
| 8,109,650 B2 | 2/2012 | Chang et al. | |
| 8,119,945 B2 | 2/2012 | Lin | |
| 8,124,903 B2 | 2/2012 | Tatehata et al. | |
| 8,134,094 B2 | 3/2012 | Tsao et al. | |
| 8,143,982 B1 | 3/2012 | Lauder et al. | |
| 8,156,172 B2 | 4/2012 | Muehl et al. | |
| 8,178,808 B2 | 5/2012 | Strittmatter et al. | |
| 8,184,021 B2 | 5/2012 | Chou | |
| 8,212,160 B2 | 7/2012 | Tsao | |
| 8,212,162 B2 | 7/2012 | Zhou | |
| 8,218,301 B2 | 7/2012 | Lee | |
| 8,232,958 B2 | 7/2012 | Tolbert | |
| 8,246,228 B2 | 8/2012 | Ko et al. | |
| 8,253,048 B2 | 8/2012 | Ozias et al. | |
| 8,253,052 B2 | 9/2012 | Chen | |
| 8,263,887 B2 | 9/2012 | Chen et al. | |
| 8,289,280 B2 | 10/2012 | Travis | |
| 8,299,382 B2 | 10/2012 | Takemae et al. | |
| 8,317,384 B2 | 11/2012 | Chung et al. | |
| 8,319,298 B2 | 11/2012 | Hsu | |
| 8,325,141 B2 | 12/2012 | Marsden | |
| 8,330,725 B2 | 12/2012 | Mahowald et al. | |

(56) References Cited

U.S. PATENT DOCUMENTS

| | | |
|---|---|---|
| 8,354,629 B2 | 1/2013 | Lin |
| 8,378,857 B2 | 2/2013 | Pance |
| 8,383,972 B2 | 2/2013 | Liu |
| 8,384,566 B2 | 2/2013 | Bocirnea |
| 8,404,990 B2 | 3/2013 | Lutgring et al. |
| 8,451,146 B2 | 3/2013 | Mahowald et al. |
| 8,431,849 B2 | 4/2013 | Chen |
| 8,436,265 B2 | 5/2013 | Koike et al. |
| 8,462,514 B2 | 6/2013 | Myers et al. |
| 8,500,348 B2 | 8/2013 | Dumont et al. |
| 8,502,094 B2 | 8/2013 | Chen |
| 8,542,194 B2 | 9/2013 | Akens et al. |
| 8,548,528 B2 | 10/2013 | Kim et al. |
| 8,564,544 B2 | 10/2013 | Jobs et al. |
| 8,569,639 B2 | 10/2013 | Strittmatter |
| 8,575,632 B2 | 11/2013 | Kuramoto et al. |
| 8,581,127 B2 | 11/2013 | Jhuang et al. |
| 8,592,699 B2 | 11/2013 | Kessler et al. |
| 8,592,702 B2 | 11/2013 | Tsai |
| 8,592,703 B2 | 11/2013 | Johnson et al. |
| 8,604,370 B2 | 12/2013 | Chao |
| 8,629,362 B1 | 1/2014 | Knighton et al. |
| 8,633,916 B2 | 1/2014 | Bernstein et al. |
| 8,642,904 B2 | 2/2014 | Chiba et al. |
| 8,651,720 B2 | 2/2014 | Sherman et al. |
| 8,659,882 B2 | 2/2014 | Liang et al. |
| 8,692,784 B2 | 4/2014 | Cheng |
| 8,731,618 B2 | 5/2014 | Jarvis et al. |
| 8,748,767 B2 | 6/2014 | Ozias et al. |
| 8,759,705 B2 | 6/2014 | Funakoshi et al. |
| 8,760,405 B2 | 6/2014 | Nam |
| 8,786,548 B2 | 7/2014 | Oh et al. |
| 8,791,378 B2 | 7/2014 | Lan |
| 8,835,784 B2 | 9/2014 | Hirota |
| 8,847,090 B2 | 9/2014 | Ozaki |
| 8,847,711 B2 | 9/2014 | Yang et al. |
| 8,853,580 B2 | 10/2014 | Chen |
| 8,854,312 B2 | 10/2014 | Meierling |
| 8,870,477 B2 | 10/2014 | Merminod et al. |
| 8,884,174 B2 | 11/2014 | Chou et al. |
| 8,921,473 B1 | 12/2014 | Hyman |
| 8,922,476 B2 | 12/2014 | Stewart et al. |
| 8,926,111 B2 | 1/2015 | Weng |
| 8,927,890 B2 | 1/2015 | Peterson et al. |
| 8,943,427 B2 | 1/2015 | Heo et al. |
| 8,963,036 B2 | 2/2015 | Mittleman et al. |
| 8,976,117 B2 | 3/2015 | Krahenbuhl et al. |
| 8,994,641 B2 | 3/2015 | Stewart et al. |
| 9,007,297 B2 | 4/2015 | Stewart et al. |
| 9,012,795 B2 | 4/2015 | Niu et al. |
| 9,024,214 B2 | 5/2015 | Niu et al. |
| 9,029,723 B2 | 5/2015 | Pegg |
| 9,041,652 B2 | 5/2015 | Elias et al. |
| 9,063,627 B2 | 6/2015 | Yairi et al. |
| 9,064,642 B2 | 6/2015 | Welch et al. |
| 9,086,733 B2 | 7/2015 | Pance |
| 9,087,663 B2 | 7/2015 | Los |
| 9,093,229 B2 | 7/2015 | Leong et al. |
| 9,189,078 B2 | 11/2015 | Mahowald et al. |
| 9,195,314 B2 | 11/2015 | Sharma |
| 9,213,416 B2 | 12/2015 | Chen |
| 9,223,352 B2 | 12/2015 | Smith et al. |
| 9,234,486 B2 | 1/2016 | Das et al. |
| 9,235,236 B2 | 1/2016 | Nam |
| 9,274,654 B2 | 3/2016 | Slobodin et al. |
| 9,275,810 B2 | 3/2016 | Pance et al. |
| 9,288,373 B2 | 3/2016 | Xie et al. |
| 9,298,273 B2 | 3/2016 | Shao et al. |
| 9,300,033 B2 | 3/2016 | Han et al. |
| 9,305,496 B2 | 4/2016 | Kimura |
| 9,348,425 B2 | 5/2016 | Chi et al. |
| 9,349,551 B2 | 5/2016 | Nakajima |
| 9,360,891 B1 | 6/2016 | Van Der Merwe |
| 9,405,369 B2 | 8/2016 | Modarres et al. |
| 9,412,533 B2 | 8/2016 | Hendren et al. |
| 9,443,672 B2 | 9/2016 | Martisauskas |
| 9,444,454 B2 | 9/2016 | Hovden |
| 9,448,628 B2 | 9/2016 | Tan et al. |
| 9,448,631 B2 | 9/2016 | Winter et al. |
| 9,449,772 B2 | 9/2016 | Leong et al. |
| 9,454,239 B2 | 9/2016 | Elias |
| 9,471,185 B2 | 10/2016 | Guard |
| 9,477,382 B2 | 10/2016 | Hicks et al. |
| 9,502,193 B2 | 11/2016 | Niu et al. |
| 9,612,664 B2 | 4/2017 | Croisonnier |
| 9,612,674 B2 | 4/2017 | Degner et al. |
| 9,640,347 B2 | 5/2017 | Kwan et al. |
| 9,704,665 B2 | 7/2017 | Brock et al. |
| 9,704,670 B2 | 7/2017 | Leong |
| 9,710,069 B2 | 7/2017 | Leong et al. |
| 9,715,978 B2 | 7/2017 | Hendren |
| 9,734,965 B2 | 8/2017 | Martinez et al. |
| 9,746,923 B2 | 8/2017 | Cruz-Hernandez et al. |
| 9,793,066 B1 | 10/2017 | Brock |
| 9,910,211 B2 | 3/2018 | Kloeppel et al. |
| 9,941,879 B2 | 4/2018 | Lee et al. |
| 10,001,812 B2 | 6/2018 | Andre et al. |
| 10,175,771 B2 | 1/2019 | Barneron |
| 10,284,196 B2 | 5/2019 | Hanssen et al. |
| 10,353,485 B1 | 7/2019 | Zhang et al. |
| 10,585,493 B2 | 3/2020 | Elias |
| 10,615,793 B2 | 4/2020 | Kawaguchi et al. |
| 10,755,877 B1 | 8/2020 | Wang et al. |
| 10,775,850 B2 | 9/2020 | Wang et al. |
| 10,796,863 B2 | 10/2020 | Stringer et al. |
| 2001/0048837 A1* | 12/2001 | Parkinson ............. G06F 3/0216 400/489 |
| 2002/0079211 A1 | 6/2002 | Katayama et al. |
| 2002/0093436 A1 | 7/2002 | Lien |
| 2002/0113770 A1 | 8/2002 | Jacobson et al. |
| 2002/0149835 A1 | 10/2002 | Kanbe |
| 2003/0169232 A1 | 9/2003 | Ito |
| 2004/0004559 A1 | 1/2004 | Rast |
| 2004/0041791 A1 | 3/2004 | Dunker |
| 2004/0225965 A1 | 11/2004 | Garside et al. |
| 2005/0035950 A1 | 2/2005 | Daniels |
| 2005/0253801 A1 | 11/2005 | Kobayashi |
| 2006/0011458 A1 | 1/2006 | Purcocks |
| 2006/0020469 A1 | 1/2006 | Rast |
| 2006/0120790 A1 | 6/2006 | Chang |
| 2006/0181511 A1 | 8/2006 | Woolley |
| 2006/0243987 A1 | 11/2006 | Lai |
| 2007/0070052 A1* | 3/2007 | Westerman ......... G06F 3/04815 345/173 |
| 2007/0200823 A1 | 8/2007 | Bytheway et al. |
| 2007/0285393 A1 | 12/2007 | Ishakov |
| 2008/0131184 A1 | 6/2008 | Brown et al. |
| 2008/0136782 A1 | 6/2008 | Mundt et al. |
| 2008/0251370 A1 | 10/2008 | Aoki |
| 2009/0009482 A1* | 1/2009 | McDermid ......... G06F 3/04166 345/173 |
| 2009/0046053 A1 | 2/2009 | Shigehiro et al. |
| 2009/0103964 A1 | 4/2009 | Takagi et al. |
| 2009/0128496 A1 | 5/2009 | Huang |
| 2009/0262085 A1 | 10/2009 | Wassingbo et al. |
| 2009/0267892 A1 | 10/2009 | Faubert |
| 2010/0045705 A1 | 2/2010 | Vertegaal et al. |
| 2010/0066568 A1 | 3/2010 | Lee |
| 2010/0109921 A1 | 5/2010 | Annerfors |
| 2010/0149104 A1* | 6/2010 | Sim .................... G06F 3/04886 345/169 |
| 2010/0156796 A1 | 6/2010 | Kim et al. |
| 2010/0231508 A1* | 9/2010 | Cruz-Hernandez ......................... G06F 3/0488 345/156 |
| 2010/0253630 A1 | 10/2010 | Homma et al. |
| 2010/0321298 A1 | 12/2010 | Tsai et al. |
| 2010/0321301 A1* | 12/2010 | Casparian ............. G06F 3/016 345/168 |
| 2011/0032127 A1 | 2/2011 | Roush |
| 2011/0056817 A1 | 3/2011 | Wu |
| 2011/0056836 A1 | 3/2011 | Tatebe et al. |

(56) References Cited

U.S. PATENT DOCUMENTS

| | | |
|---|---|---|
| 2011/0115709 A1* | 5/2011 | Cruz-Hernandez ..... G06F 3/016 345/168 |
| 2011/0205179 A1 | 8/2011 | Braun |
| 2011/0242029 A1* | 10/2011 | Kasahara ............... G06F 3/044 345/173 |
| 2011/0261031 A1 | 10/2011 | Muto |
| 2011/0267272 A1 | 11/2011 | Meyer et al. |
| 2011/0284355 A1 | 11/2011 | Yang |
| 2012/0012446 A1 | 1/2012 | Hwa |
| 2012/0032972 A1 | 2/2012 | Hwang |
| 2012/0075192 A1* | 3/2012 | Marsden ............... G06F 1/1664 345/173 |
| 2012/0080297 A1 | 4/2012 | Takeuchi et al. |
| 2012/0090973 A1 | 4/2012 | Liu |
| 2012/0092263 A1 | 4/2012 | Peterson |
| 2012/0098751 A1 | 4/2012 | Liu |
| 2012/0286701 A1 | 11/2012 | Yang et al. |
| 2012/0298496 A1 | 11/2012 | Zhang |
| 2012/0313856 A1 | 12/2012 | Hsieh |
| 2013/0043115 A1 | 2/2013 | Yang et al. |
| 2013/0076635 A1 | 3/2013 | Lin |
| 2013/0093500 A1 | 4/2013 | Bruwer |
| 2013/0093733 A1 | 4/2013 | Yoshida |
| 2013/0100030 A1 | 4/2013 | Los et al. |
| 2013/0120265 A1 | 5/2013 | Horii et al. |
| 2013/0141396 A1* | 6/2013 | Lynn ...................... G06F 3/043 345/177 |
| 2013/0161170 A1 | 6/2013 | Fan et al. |
| 2013/0215079 A1 | 8/2013 | Johnson et al. |
| 2013/0228023 A1* | 9/2013 | Drasnin ............... G06F 1/1669 73/862.541 |
| 2013/0270090 A1 | 10/2013 | Lee |
| 2013/0275907 A1* | 10/2013 | Lau ...................... G06F 3/0488 715/773 |
| 2014/0015777 A1 | 1/2014 | Park et al. |
| 2014/0027259 A1 | 1/2014 | Kawana et al. |
| 2014/0071654 A1 | 3/2014 | Chien |
| 2014/0082490 A1 | 3/2014 | Jung et al. |
| 2014/0090967 A1 | 4/2014 | Inagaki |
| 2014/0098042 A1 | 4/2014 | Kuo et al. |
| 2014/0151211 A1 | 6/2014 | Zhang |
| 2014/0184496 A1 | 7/2014 | Gribetz et al. |
| 2014/0191973 A1 | 7/2014 | Zellers et al. |
| 2014/0218640 A1* | 8/2014 | Chi ...................... G06F 3/0202 400/490 |
| 2014/0218851 A1 | 8/2014 | Klein et al. |
| 2014/0247222 A1* | 9/2014 | Ferren .................... G06F 21/40 345/168 |
| 2014/0252881 A1 | 9/2014 | Dinh et al. |
| 2014/0291133 A1 | 10/2014 | Fu et al. |
| 2014/0375141 A1 | 12/2014 | Nakajima |
| 2015/0010723 A1 | 1/2015 | Krishnan et al. |
| 2015/0016038 A1 | 1/2015 | Niu et al. |
| 2015/0083561 A1 | 3/2015 | Han et al. |
| 2015/0116205 A1* | 4/2015 | Westerman ......... G06F 3/04847 345/156 |
| 2015/0192960 A1 | 7/2015 | Sharma |
| 2015/0268768 A1* | 9/2015 | Woodhull ............. G06F 3/0418 345/168 |
| 2015/0270073 A1 | 9/2015 | Yarak, III et al. |
| 2015/0277504 A1 | 10/2015 | Odell |
| 2015/0277559 A1 | 10/2015 | Vescovi et al. |
| 2015/0277620 A1 | 10/2015 | Bulea |
| 2015/0287553 A1 | 10/2015 | Welch et al. |
| 2015/0309538 A1 | 10/2015 | Zhang |
| 2015/0370339 A1 | 12/2015 | Ligtenberg et al. |
| 2015/0378391 A1 | 12/2015 | Huitema et al. |
| 2016/0011691 A1 | 1/2016 | Shinkai et al. |
| 2016/0049266 A1 | 2/2016 | Stringer et al. |
| 2016/0093452 A1 | 3/2016 | Zercoe et al. |
| 2016/0096195 A1 | 4/2016 | Barnes et al. |
| 2016/0154464 A1* | 6/2016 | Croisonnier .......... G06F 3/0304 345/168 |
| 2016/0172129 A1 | 6/2016 | Zercoe et al. |
| 2016/0189890 A1 | 6/2016 | Leong et al. |
| 2016/0189891 A1 | 6/2016 | Zercoe et al. |
| 2016/0329166 A1 | 11/2016 | Hou et al. |
| 2016/0336124 A1 | 11/2016 | Leong et al. |
| 2016/0336127 A1 | 11/2016 | Leong et al. |
| 2016/0336128 A1 | 11/2016 | Leong et al. |
| 2016/0343523 A1 | 11/2016 | Hendren et al. |
| 2016/0351360 A1 | 12/2016 | Knopf et al. |
| 2016/0365204 A1 | 12/2016 | Cao et al. |
| 2016/0378234 A1 | 12/2016 | Ligtenberg et al. |
| 2016/0379775 A1 | 12/2016 | Leong et al. |
| 2017/0004937 A1 | 1/2017 | Leong et al. |
| 2017/0004939 A1 | 1/2017 | Kwan et al. |
| 2017/0011869 A1 | 1/2017 | Knopf et al. |
| 2017/0090104 A1 | 3/2017 | Cao et al. |
| 2017/0090106 A1 | 3/2017 | Cao et al. |
| 2017/0102809 A1* | 4/2017 | Son ...................... G06F 3/0412 |
| 2017/0301487 A1 | 10/2017 | Leong et al. |
| 2017/0315624 A1 | 11/2017 | Leong et al. |
| 2017/0315628 A1 | 11/2017 | Yao |
| 2018/0029339 A1 | 2/2018 | Liu et al. |
| 2018/0040441 A1 | 2/2018 | Wu et al. |
| 2020/0379520 A1 | 12/2020 | Wang et al. |

FOREIGN PATENT DOCUMENTS

| | | |
|---|---|---|
| CN | 1533128 | 9/2004 |
| CN | 1542497 | 11/2004 |
| CN | 2672832 | 1/2005 |
| CN | 1624842 | 6/2005 |
| CN | 1812030 | 8/2006 |
| CN | 1838036 | 9/2006 |
| CN | 1855332 | 11/2006 |
| CN | 101051569 | 10/2007 |
| CN | 200961844 | 10/2007 |
| CN | 200986871 | 12/2007 |
| CN | 101146137 | 3/2008 |
| CN | 201054315 | 4/2008 |
| CN | 201084602 | 7/2008 |
| CN | 201123174 | 9/2008 |
| CN | 201149829 | 11/2008 |
| CN | 101315841 | 12/2008 |
| CN | 201210457 | 3/2009 |
| CN | 101438228 | 5/2009 |
| CN | 101465226 | 6/2009 |
| CN | 101494130 | 7/2009 |
| CN | 101502082 | 8/2009 |
| CN | 201298481 | 8/2009 |
| CN | 101546667 | 9/2009 |
| CN | 101572195 | 11/2009 |
| CN | 101800281 | 8/2010 |
| CN | 101807482 | 8/2010 |
| CN | 101868773 | 10/2010 |
| CN | 201655616 | 11/2010 |
| CN | 102110542 | 6/2011 |
| CN | 102119430 | 7/2011 |
| CN | 201904256 | 7/2011 |
| CN | 102163084 | 8/2011 |
| CN | 201927524 | 8/2011 |
| CN | 201945951 | 8/2011 |
| CN | 201945952 | 8/2011 |
| CN | 201956238 | 8/2011 |
| CN | 102197452 | 9/2011 |
| CN | 102214038 | 10/2011 |
| CN | 202008941 | 10/2011 |
| CN | 202040690 | 11/2011 |
| CN | 102280292 | 12/2011 |
| CN | 102338348 | 2/2012 |
| CN | 102375550 | 3/2012 |
| CN | 202205161 | 4/2012 |
| CN | 102496509 | 6/2012 |
| CN | 10269527 | 8/2012 |
| CN | 102622089 | 8/2012 |
| CN | 102629526 | 8/2012 |
| CN | 202372927 | 8/2012 |
| CN | 102679239 | 9/2012 |
| CN | 102683072 | 9/2012 |
| CN | 202434387 | 9/2012 |
| CN | 102713805 | 10/2012 |

(56) References Cited

FOREIGN PATENT DOCUMENTS

| | | |
|---|---|---|
| CN | 202523007 | 11/2012 |
| CN | 102832068 | 12/2012 |
| CN | 102955573 | 3/2013 |
| CN | 102956386 | 3/2013 |
| CN | 102969183 | 3/2013 |
| CN | 103000417 | 3/2013 |
| CN | 103165327 | 6/2013 |
| CN | 103180979 | 6/2013 |
| CN | 203012648 | 6/2013 |
| CN | 203135988 | 8/2013 |
| CN | 103377841 | 10/2013 |
| CN | 103489986 | 1/2014 |
| CN | 203405773 | 1/2014 |
| CN | 203414880 | 1/2014 |
| CN | 103681056 | 3/2014 |
| CN | 103699181 | 4/2014 |
| CN | 203520312 | 4/2014 |
| CN | 203588895 | 5/2014 |
| CN | 103839715 | 6/2014 |
| CN | 103839720 | 6/2014 |
| CN | 103839722 | 6/2014 |
| CN | 203630729 | 6/2014 |
| CN | 103903891 | 7/2014 |
| CN | 103956290 | 7/2014 |
| CN | 203733685 | 7/2014 |
| CN | 104021968 | 9/2014 |
| CN | 204102769 | 1/2015 |
| CN | 204117915 | 1/2015 |
| CN | 104517769 | 4/2015 |
| CN | 204632641 | 9/2015 |
| CN | 105097341 | 11/2015 |
| CN | 205028245 | 2/2016 |
| CN | 105446646 | 3/2016 |
| CN | 206339935 | 7/2017 |
| DE | 2530176 | 1/1977 |
| DE | 3002772 | 7/1981 |
| DE | 29704100 | 4/1997 |
| DE | 202008001970 | 8/2008 |
| EP | 0441993 | 8/1991 |
| EP | 1835272 | 9/2007 |
| EP | 1928008 | 6/2008 |
| EP | 2202606 | 6/2010 |
| EP | 2426688 | 3/2012 |
| EP | 2439760 | 4/2012 |
| EP | 2463798 | 6/2012 |
| EP | 2664979 | 11/2013 |
| FR | 2147420 | 3/1973 |
| FR | 2911000 | 7/2008 |
| FR | 2950193 | 3/2011 |
| GB | 1361459 | 7/1974 |
| JP | S50115562 | 9/1975 |
| JP | 59171414 | 3/1983 |
| JP | S60055477 | 3/1985 |
| JP | S61172422 | 10/1986 |
| JP | S62072429 | 4/1987 |
| JP | 62237618 | 10/1987 |
| JP | S63182024 | 11/1988 |
| JP | H0422024 | 4/1992 |
| JP | H0520963 | 1/1993 |
| JP | H0524512 | 8/1993 |
| JP | 405225850 | 9/1993 |
| JP | H05342944 | 12/1993 |
| JP | H09204148 | 8/1997 |
| JP | H10312726 | 11/1998 |
| JP | H11194882 | 7/1999 |
| JP | 2000010709 | 1/2000 |
| JP | 2000057871 | 2/2000 |
| JP | 2000339097 | 12/2000 |
| JP | 2001100889 | 4/2001 |
| JP | 2003114751 | 9/2001 |
| JP | 2002260478 | 9/2002 |
| JP | 2002298689 | 10/2002 |
| JP | 2003522998 | 7/2003 |
| JP | 2005108041 | 4/2005 |
| JP | 2006164929 | 6/2006 |
| JP | 2006185906 | 7/2006 |
| JP | 2006521664 | 9/2006 |
| JP | 2006269439 | 10/2006 |
| JP | 2006277013 | 10/2006 |
| JP | 2006344609 | 12/2006 |
| JP | 2007115633 | 5/2007 |
| JP | 2007514247 | 5/2007 |
| JP | 2007156983 | 6/2007 |
| JP | 2008021428 | 1/2008 |
| JP | 2008041431 | 2/2008 |
| JP | 2008100129 | 5/2008 |
| JP | 2008191850 | 8/2008 |
| JP | 2008533559 | 8/2008 |
| JP | 2008293922 | 12/2008 |
| JP | 2009099503 | 5/2009 |
| JP | 2009181894 | 8/2009 |
| JP | 2010061956 | 3/2010 |
| JP | 2010244088 | 10/2010 |
| JP | 2010244302 | 10/2010 |
| JP | 2011018484 | 1/2011 |
| JP | 2011065126 | 3/2011 |
| JP | 2011150804 | 8/2011 |
| JP | 2011165630 | 8/2011 |
| JP | 2011524066 | 8/2011 |
| JP | 2011187297 | 9/2011 |
| JP | 2012022473 | 2/2012 |
| JP | 2012043267 | 3/2012 |
| JP | 2012043705 | 3/2012 |
| JP | 2012063630 | 3/2012 |
| JP | 2012083840 | 4/2012 |
| JP | 2012088215 | 5/2012 |
| JP | 2012098873 | 5/2012 |
| JP | 2012134064 | 7/2012 |
| JP | 2012186067 | 9/2012 |
| JP | 2012230256 | 11/2012 |
| JP | 2013511108 | 3/2013 |
| JP | 2014017179 | 1/2014 |
| JP | 2014026807 | 2/2014 |
| JP | 2014216190 | 11/2014 |
| JP | 2014220039 | 11/2014 |
| JP | 2016053778 | 4/2016 |
| JP | 2016510547 | 4/2016 |
| KR | 1019990007394 | 1/1999 |
| KR | 1020020001668 | 1/2002 |
| KR | 100454203 | 10/2004 |
| KR | 1020060083032 | 7/2006 |
| KR | 1020080064116 | 7/2008 |
| KR | 1020080066164 | 7/2008 |
| KR | 2020110006385 | 6/2011 |
| KR | 1020120062797 | 6/2012 |
| KR | 1020130040131 | 4/2013 |
| KR | 20150024201 | 3/2015 |
| TW | 200703396 | 1/2007 |
| TW | M334397 | 6/2008 |
| TW | 201108284 | 3/2011 |
| TW | 201108286 | 3/2011 |
| TW | M407429 | 7/2011 |
| TW | 201246251 | 11/2012 |
| TW | 201403646 | 1/2014 |
| WO | WO9744946 | 11/1997 |
| WO | WO2005/057320 | 6/2005 |
| WO | WO2006/022313 | 3/2006 |
| WO | WO2007/049253 | 5/2007 |
| WO | WO2008/045833 | 4/2008 |
| WO | WO2009/005026 | 1/2009 |
| WO | WO2012/011282 | 1/2012 |
| WO | WO2012/027978 | 3/2012 |
| WO | WO2013/096478 | 6/2013 |
| WO | WO2014175446 | 10/2014 |

\* cited by examiner

KEYLESS KEYBOARD WITH FORCE SENSING AND HAPTIC FEEDBACK

CROSS-REFERENCE TO RELATED APPLICATION(S)

This application is a nonprovisional patent application of and claims the benefit of U.S. Provisional Patent Application No. 62/393,989, filed Sep. 13, 2016 and titled "Keyless Keyboard with Force Sensing and Haptic Feedback," the disclosure of which is hereby incorporated herein by reference in its entirety.

FIELD

The described embodiments relate generally to computing input devices. More particularly, the present embodiments relate to force- and/or touch-sensitive input devices having haptic feedback.

BACKGROUND

Traditional computing input devices, such as mice, keyboards, and trackpads, tend to operate using dedicated keys or buttons. The operation of each key or button may be tied to a particular function or command. However, traditional input devices lack the flexibility to accommodate expansive features offered by newer devices, operating systems, and software. As a further drawback, the dedicated keys or buttons of traditional input devices are unable to adapt to different user needs and preferences.

Alternative input devices, such as touch-input devices, appear to offer some greater flexibility for input scenarios and customization than mechanical keyboards, mice, and similar input devices. However, touch sensitive input devices often have a flat, inflexible input surface that gives little or no tactile feedback to a user and may therefore be less desirable for many scenarios than traditional input devices.

Therefore, improved input devices are needed to provide both greater flexibility and customizability while providing feedback to a user during operation.

SUMMARY

An input device for an electronic device may include an enclosure and a top member coupled to the enclosure and defining an input surface having multiple differentiated input regions. The input device may further include a first force sensing system associated with a first area of the top member including a first group of the differentiated input regions, the first force sensing system configured to determine a first force associated with a first force input applied within the first area, and a second force sensing system associated with a second area of the top member including a second group of the differentiated input regions, the second force sensing system configured to determine a second force associated with a second force input applied within the second area. The input device may further include a touch sensing system configured to determine which input region from the first group of the differentiated input regions corresponds to the first force input and to determine which input region from the second group of the differentiated input regions corresponds to the second force input.

The first force sensing system may be configured to determine the first force independently of the second force sensing system. The first group of the differentiated input regions may correspond to keys typically selected by a first finger of a user's hand, and the second group of the differentiated input regions may correspond to keys typically selected by a second finger of the user's hand.

The multiple differentiated input regions may correspond to keys of a keyboard. The multiple differentiated input regions may be visually differentiated on the top member. The input device may be configured to detect a key press of a particular input region by detecting, within a given group of the differentiated input regions, both a touch location and a force value satisfying a force threshold. The input device may further comprise a haptic output system configured to produce a tactile output in response to detecting the key press.

The haptic output system may include a first actuator having a first actuation axis along a first direction and a second actuator having a second actuation axis along a second direction that is not parallel to the first direction. The input device may be configured to alternate between actuating the first actuator and the second actuator in response to detecting successive key presses.

The first and the second force sensing systems may be part of a group of force sensing systems, and the group of force sensing systems may define two rows of force sensing regions on the top member. The first and second groups of the differentiated input regions may be oriented substantially diagonally with respect to a longitudinal axis of the input device.

A keyboard for an electronic device includes an enclosure and a cover coupled to the enclosure and defining an input surface. The keyboard also includes a first actuator within the enclosure and coupled to the cover and a second actuator within the enclosure and coupled to the cover. The first actuator is configured to impart, to the cover, a first force along a first axis that is substantially parallel to the input surface, and the second actuator is configured to impart, to the cover, a second force along a second axis that is perpendicular to the first axis and substantially parallel to the input surface.

The first actuator may be configured to oscillate along the first axis to impart the first force to the cover, and the second actuator may be configured to oscillate along the second axis to impart the second force to the cover. The keyboard may further include a force sensing system within the enclosure and configured to detect the successive force inputs on the input regions.

The keyboard may be incorporated into an electronic device that includes a display coupled to the enclosure, wherein the display is distinct from the keyboard. The input surface may include input regions representing character input keys, and the first actuator and the second actuator may be configured to provide haptic feedback to a user to induce a sensation representative of a mechanical key. The keyboard may be configured to alternate between actuating the first actuator and the second actuator in response to successive force inputs on the input regions. The keyboard may also or instead be configured to actuate the first and second actuator substantially simultaneously (or such that the actuations of the first and second actuators overlap in time).

A force sensing system for an electronic device may include a cover defining an input surface comprising multiple input regions each corresponding to an input key. The cover may be configured to locally deform in response to an input force applied to an input region of the multiple input regions. The force sensing system may include a capacitive sense layer below the cover, a compliant material between the cover and the capacitive sense layer and below the input regions, and a processor electrically coupled to the capacitive sense layer. The processor may be configured to determine a force value of the input force based on a change in capacitance between the capacitive sense layer and an input member applied to the input region, and determine a location of the input force based on which of a set of electrodes detected the change in capacitance. The capacitive sense layer may include a set of electrodes each having an area that is the same or smaller than an area of the input regions. The force sensing system may be configured to differentiate between force inputs having centroids about 3.0 cm apart or less.

The force sensing system may be coupled to a lower portion of an enclosure of a notebook computer and may be configured as a keyboard for the notebook computer. The multiple input regions may be visually differentiated to define a keyboard for the notebook computer. The notebook computer may include a display coupled to an upper portion of the enclosure.

The cover may be formed from a glass. The glass may have an elastic modulus in a range of about 60 to about 80 GPa. The glass may have a thickness in a range of about 0.1 to about 0.5 mm. The compliant material may have a thickness in a range of about 0.5 mm to about 2.0 mm. The compliant material may be a foam.

The force sensing system may exclude additional capacitive sense layers between the cover and the compliant material.

The input surface may include multiple input regions each corresponding to an input key, and the capacitive sense layer may include a set of electrodes each having an area that is the same or smaller than an area of the input regions.

A method of detecting a key press includes determining a number of fingers in contact with an input surface of an electronic device, and determining a force threshold indicative of a key press based at least in part on the number of fingers in contact with the input surface. The method may further include detecting a force input that satisfies the force threshold, and in response to detecting the force input, registering a selection of an input region corresponding to a text character.

The operation of determining the number of fingers in contact with the input surface may include using a touch sensing system to determine the number of fingers in contact with the input surface. The force threshold may be between about 25 and 150 grams higher than a baseline force for the determined number of fingers in contact with the input surface.

The method may further include detecting a touch input corresponding to a movement across the input surface, and in response to detecting the touch input corresponding to the movement across the input surface, changing a position of a cursor on a display of the electronic device. The operation of detecting the force input may include detecting the force input with a force sensing system, and the operation of detecting the touch input comprises detecting the touch input with a touch sensing system.

BRIEF DESCRIPTION OF THE DRAWINGS

The disclosure will be readily understood by the following detailed description in conjunction with the accompanying drawings, wherein like reference numerals designate like structural elements, and in which.

Figure 1:
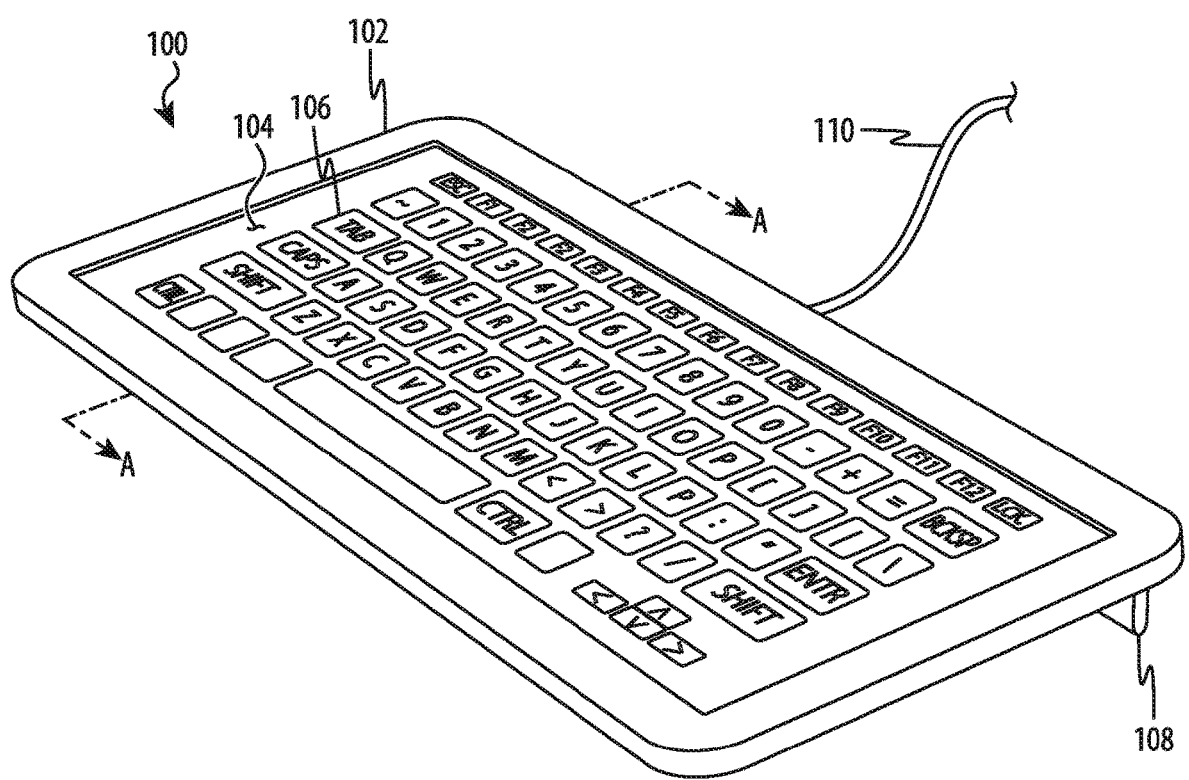
FIG. 1 depicts an example input device.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to an input device that uses touch and/or force sensing to detect user inputs, and uses haptic outputs to provide feedback to a user. One example of such an input device is a keyboard that does not have mechanical or movable keys. Instead, the keyboard may have a flat, keyless input surface, such as a glass or metal layer, and may include touch and/or force sensing systems to determine when a user touches and/or presses on the surface. Haptic actuators may provide physical feedback to indicate that a user has pressed the keyless surface with sufficient force to register an input. The haptic actuators may induce a physical sensation that is similar to or representative of a mechanical key. For example, when a user presses the surface of the keyboard with sufficient force, the surface may vibrate or otherwise move to indicate to the user that the intended input has been registered.

Using force sensing in addition to touch sensing may allow a user to use a keyless keyboard more similarly to a mechanical keyboard. For example, when typing, users typically rest multiple fingers on the keyboard. With only touch sensing on a keyless keyboard (e.g., without force sensing), it may be difficult or impossible to determine whether a user is attempting to select a particular key, or whether the user is merely resting a finger on that key. Force sensing, instead of or in addition to touch sensing, allows a keyless keyboard to differentiate between incidental contact and intentional key selections.

Force sensing in a keyless keyboard may be either global or local. For global force sensing, the keyboard may determine a total amount or magnitude of force applied to the surface regardless of the position or number of fingers on the surface. As noted above, however, users may rest their fingers on keys that are not being actively selected. Moreover, different users may rest different numbers of fingers on the keys, or rest them with different amounts of force. And the same user may rest different numbers of fingers on the keys at different moments while typing. Thus, the force threshold for detecting a key press may change depending on how many fingers are touching the keyboard. Accordingly, a keyboard with global force sensing may set a force threshold that determines whether a key is pressed based on the number of fingers that are in contact with the surface at a given time (as detected by a touch sensing system, for example).

For local force sensing, the keyboard may determine an amount or magnitude of force applied to a particular location or locations on the surface. One example local force sensing system uses a pixelated capacitive sense layer below the surface of the keyboard. When pressed, the user's finger may form a depression in the keyboard surface beneath the finger. The pixelated capacitive sense layer may detect the depth and/or location of the depression to determine both an amount and a location of a force. Keyboards may use either global or local force sensing alone, or they may use a combination of these techniques.

Haptic output may also be global or local. For global haptic outputs, the entire keyboard surface may move to provide a haptic output. In such cases, all of the fingers that are resting on the keyboard surface may sense the haptic output. Global haptic outputs may be produced, for example, with a haptic actuator that moves the entire surface in-plane with an input surface of the keyboard (e.g., an x- or y-direction) or out-of-plane with the input surface (e.g., a z-direction). In some embodiments, in order to provide discrete global haptic outputs for subsequent key presses, multiple haptic actuators may be provided. For example, a single haptic actuator that vibrates the input surface may not be able to produce successive, discrete haptic outputs with a key-strike frequency of a user. Accordingly, multiple haptic actuators may be used. In some cases, the actuators may produce different haptic outputs, such as vibrations in different directions. Users may be able to differentiate between such outputs, even if they are produced substantially simultaneously.

For local haptic outputs, only a portion of the keyboard may move. For example, localized haptic actuators such as piezoelectric elements may cause localized deformations in the surface that are felt only (or primarily) by a finger directly under the deformation. In another example, electrostatic elements may selectively apply an electrostatic charge to the input surface or to portions thereof. The electrostatic charge may alter or modify a tactile or touch-based stimulus that is perceived by a user. The electrostatic charge may cause an actual or perceived change in friction or surface roughness between an object (e.g., the user's finger) and the input surface by electrostatically attracting the user's finger to the surface. A keyboard may use global or local haptic outputs, alone or in combination, to provide a desired haptic output to the user.

Because the keyboard does not have mechanical keys, the keyboard may provide numerous other features and functions beyond mere keyboard input. For example, the keyboard may include an adaptive display to render visual information, such as an outline of an input region (e.g., representing a key) and an indication of its function (e.g., a glyph). In this way, the location, size, spacing and/or arrangement of the keys may vary. As another example, the input surface of the keyboard may act as a touch pad to detect touch inputs (e.g., moving a cursor, manipulating user interface elements) as well as typing inputs.

While the instant discussion uses a keyboard as an example input device that uses force sensing to detect inputs and haptic outputs to provide tactile feedback, these techniques may be used in other input devices as well. For example, where the input device includes an adaptive display, the display may present representations of varied affordances or objects that can be manipulated and for which physical feedback can be provided, such as audio mixers, buttons, musical instruments, etc. Moreover, force sensing and haptic outputs may be used in devices other than flat, keyboard-like input devices. For example, a rotating input device, such as a knob, may detect inputs with force sensing systems and provide haptic outputs to convey feedback to a user.

These and other embodiments are discussed below with reference to the figures. However, those skilled in the art will readily appreciate that the detailed description given herein with respect to these figures is for explanatory purposes only and should not be construed as limiting.

FIG. 1 illustrates an example keyboard 100 that uses force sensing systems to detect user inputs and uses haptic actuators to provide tactile outputs. As shown, the keyboard 100 is in the form of a stand-alone keyboard. However, the keyboard 100 may be coupled to other devices (physically and/or communicatively), such as a desktop computing system (FIG. 18), a laptop or notebook computing system (FIGS. 16 and 17), a cover for a portable electronic device (FIG. 19), a mouse, and so on. Example internal components of the keyboard 100 (and/or a computing device to which the keyboard 100 may be physically or communicatively coupled) are described below with respect to FIG. 20.

As shown in FIG. 1, the keyboard 100 includes an enclosure 102 and a top member or cover 104 coupled to the enclosure 102. The enclosure 102 may provide structural support to the top member or cover 104, and may include additional features such as a support stand 108. As described herein, the keyboard 100 may include within the enclosure 102 components such as force sensing systems, haptic actuators, touch sensing systems, display components, and the like.

The cover 104 (or top member) defines an input surface of the keyboard 100. In the present example, the cover 104 is positioned on a top surface of the keyboard 100, instead of physical keys. The cover 104, or top member, may be or may include any appropriate materials, such as glass, metal, plastic, etc. The cover 104 may include or be coupled to other layers, such as filters, coatings, touch-sensitive layers, liquid crystal layers, display components (e.g., organic light emitting diode (OLED) layers, light sources, light guides), and the like. Although shown without any mechanical keys, the keyboard 100 may also include one or more mechanical keys.

The cover 104 may operate as a touch-sensitive surface. For example, the cover 104 may respond to a touch input and may include or be coupled to a touch sensing system configured to determine the location of a touch input on the cover 104. The cover 104 may receive a wide variety of touch inputs, which may be used to interpret a diverse set of commands or operations.

The cover 104 may additionally or alternatively be configured to operate as a force-sensitive surface. For example, the cover 104 may include or be coupled to a force sensing system configured to detect a location and/or amount of force applied to the cover 104. The force sensing system may include (or may be operably connected to) force sensing circuitry configured to determine or estimate an amount of applied force. The force sensing circuitry may output a signal or otherwise register that an input has been detected in response to determining an amount of force that exceeds a force threshold. The force threshold may be fixed or variable, and more than one threshold may be provided corresponding to different inputs. For example, the threshold may be based on the number of fingers in contact with the cover 104.

The cover 104 may also include differentiated input regions 106. For example, at least some of the differentiated input regions 106 may correspond to character input keys (e.g., alphanumeric characters, symbolic characters, text spaces, tabs, and the like). In some cases, other keys may control other aspects of a device without necessarily resulting in a character input (e.g., to control audio volume, screen brightness, or other device functions).

The differentiated input regions 106 may be regions of a cover (or other top member that defines an input surface) that are visually and/or tactilely differentiated or distinguished from one another with paint, ink, etching, grooves, bumps, ridges, textures, or the like. Differentiated input regions 106 may correspond to character input keys (e.g., keys of an alphanumeric keyboard), buttons, or other affordances. Differentiated input regions 106 may be referred to herein simply as input regions 106.

In some cases, the differentiated input regions 106 may be differentiated from one another virtually. For example, the cover 104 may include or be part of an adaptable display. The adaptable display may be an illuminated display that is configured to display visual indicia that correspond to one or more differentiated input regions 106. Where the differentiated input region 106 is virtually defined by the adaptable display, it may be referred to as a virtual key. One or more different sets of visual indicia may be displayed, depending on the type of affordance being emulated, user preference, and/or an application being controlled by the keyboard 100.

The keyboard 100 may also include various other components or devices depicted or not depicted in FIG. 1. In particular, the keyboard 100 may also include one or more ports or electrical connectors positioned along one or more sides of the enclosure 102. The ports may include, for example, a USB connection port, an IEEE 1394 data port, audio connection port, video connection port, or other electrical hardware port that is configured to transmit and/or receive signals or data. The ports may also include a power connection port that is configured to receive electrical power from an external source such as a wall outlet or other power source. The keyboard 100 may also include a wired communication connection 110 for connecting to another device, or the keyboard 100 may include wireless transmitters and/or receivers for communicating with another device. Other internal components may be included, such as a processing unit. Several such internal components are described below with respect to FIG. 20.

Figure 2:
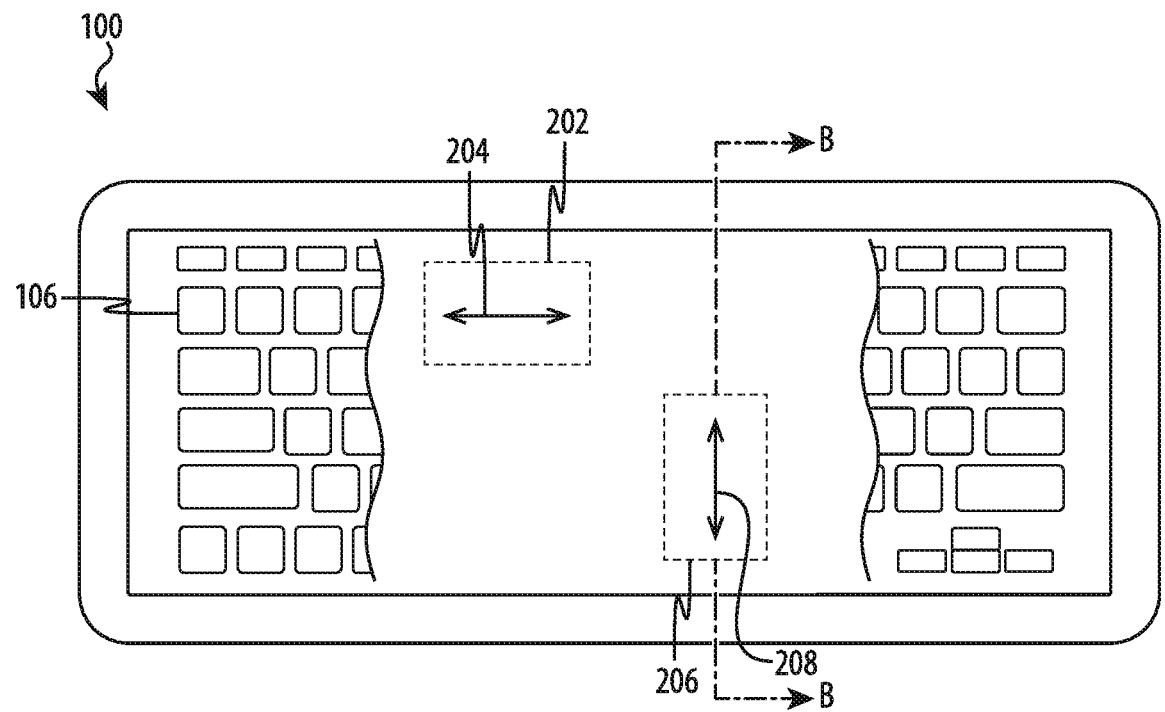
FIG. 2 depicts an example input device with haptic actuators.

As noted above, the keyboard 100 may include haptic actuators that are configured to move or otherwise impart a force to the entire cover 104 or top member of the keyboard 100. FIG. 2 is a top view of the keyboard 100, illustrating an example that includes a first actuator 202 and a second actuator 206 within the enclosure 102 and coupled to the cover 104. The first and second actuators 202, 206 may be coupled anywhere within or to the keyboard 100 as long as they impart a force to the cover 104 or otherwise produce a haptic output detectible on a top member of the keyboard 100.

The first and second actuators 202, 206 may impart to the cover 104 or other top member forces along different axes or directions. For example, the first actuator 202 may impart a force along an actuation axis or direction indicated by the arrow 204, while the second actuator 206 may impart a force along an actuation axis or direction indicated by the arrow 208. These directions may be substantially perpendicular to one another, though other relative orientations are also possible (e.g., parallel, 45 degrees, 30 degrees, etc.).

A single actuator may not be capable of providing haptic outputs (or desirable haptic outputs) at a rate sufficient to keep up with some users' typing speed. For example, some typists may strike keys at a frequency of up to ten characters per second (or more), and a single haptic actuator may not be able to produce outputs at this frequency, especially haptic outputs with relatively longer durations (e.g., outputs that are longer than 100 ms). Outputs of such durations may be desirable, however, to more closely mimic the tactile sensation of clicking on a mechanical key, or to otherwise provide a desirable user experience. Accordingly, a second haptic actuator may be provided.

By positioning the first and second actuators 202, 206 so that they impart perpendicular forces on the cover 104, interference between the motions or vibrations caused by the actuators may be reduced. For example, if the first and second actuators 202, 206 imparted forces along the same axes, the motions or vibrations imparted to the cover 104 by each actuator may cancel each other out, or otherwise interfere with each other. Moreover, it may be difficult or impossible for a user to differentiate haptic outputs from the different actuators, especially when they are both active at the same time (e.g., to indicate simultaneous or overlapping key presses). By having the actuators apply force in different directions (e.g., along perpendicular or non-parallel directions), a user may be able to discern when two haptic outputs are provided, even if the outputs overlap. While the outputs may feel the same or similar to one another (e.g., a user may not be able to differentiate the direction of the haptic actuator that produced a particular output), the start and/or end of a haptic output from one actuator may be detectable to a user even when it occurs during a haptic output from the other actuator.

The first and second actuators 202, 206 may be actuated in an alternating pattern. In some cases, the first and second actuators 202, 206 may be actuated in an alternating pattern only when a typing speed (e.g., a frequency of force inputs) exceeds a certain value, such as a frequency that is above the response frequency of only a single actuator. In such cases, if the typing speed is below the value, only one of the actuators may be used (or they may be used in a pattern other than an alternating pattern). Other patterns or schemes for actuating the first and second actuators 202, 206 in response to force inputs are also contemplated.

The first and second actuators 202, 206 may be any appropriate mechanisms or systems for producing haptic outputs or otherwise imparting a force to the cover 104. Suitable actuators may include electromechanical actuators, piezoelectric actuators (e.g., piezoelectric actuators coupled directly to the cover 104, piezo benders below the cover 104 that lift or move the cover 104), linear actuators, voice coil motors, Lorentz force actuators, electro-active polymer actuators, and so on. For example, the first and second actuators 202, 206 may be linear actuators each including a coil and a corresponding magnet, where passing a current through a coil moves the corresponding magnet (or otherwise imparts a force on the magnet).

The first and second actuators 202, 206 may impart forces to the cover 104 to produce varying kinds of haptic outputs. For example, the first and second actuators 202, 206 may oscillate along their respective axes (arrows 204, 208 in FIG. 2), thus imparting a vibration or oscillation to the cover 104. As another example, the first and second actuators 202, 206 may impart a single impulse (e.g., a single application of force in a single direction) to the cover 104. In either case, the force may be applied to a move a weight that is coupled to the actuator, or the force may be applied directly to the cover 104.

While FIG. 2 illustrates two actuators, some embodiments may include more actuators. In such cases, the actuators may be positioned to impart forces or oscillations along different directions (e.g., offset by 45 degrees from one another). Alternatively, some of the actuators may impart forces or oscillations along the same directions.

Figure 3A:
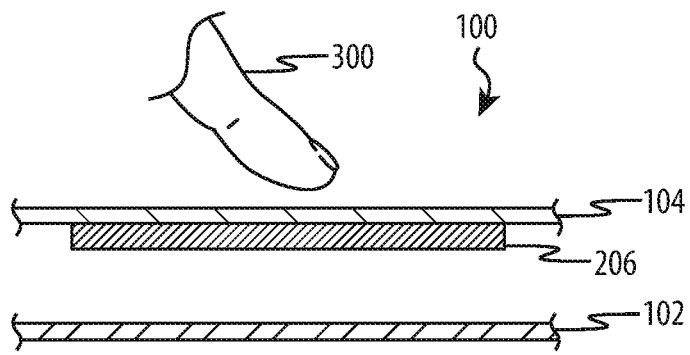
FIGS. 3A-3C depict simplified cross-sectional views of the input device of FIG. 2 showing an example haptic output.
Figure 3B:
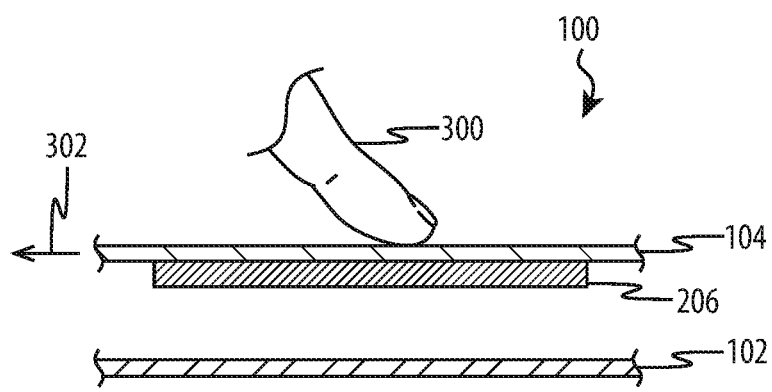
Figure 3C:
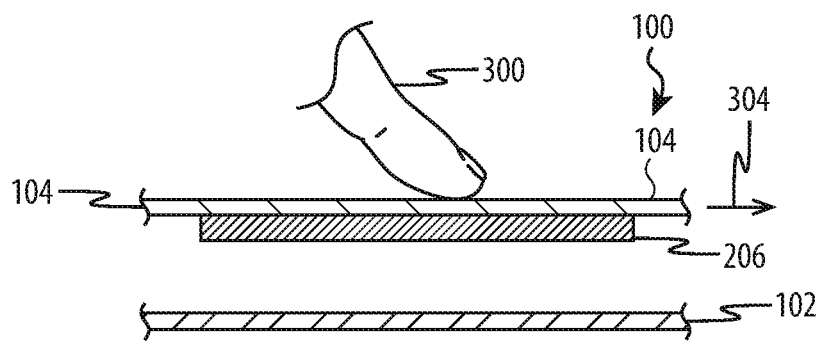

The first and second actuators 202, 206 may impart forces to the cover 104 (or top member) that are in plane (or substantially in plane) with the input surface defined by the cover 104 or other top member. FIGS. 3A-3C depict a simplified cross-sectional view of the input device of FIG. 2, viewed along line B-B in FIG. 2. For simplicity, the cross-section shown in FIGS. 3A-3C does not include internal features, components, layers, sensors, etc. that may be present in the keyboard 100. Moreover, the position of the second actuator 206 is merely for illustration, and may be positioned in a different location or to a different component than shown in FIGS. 3A-3C. For example, the keyboard 100 may include additional layers or components below (and optionally coupled to) the cover 104. In such cases, the second actuator 206 may be below the additional layers or components.

FIG. 3A shows the keyboard 100 before a finger 300 touches the cover 104. In this state, the second actuator 206 is at rest. FIG. 3B shows the keyboard 100 after an input has been registered by the keyboard 100 or a device coupled to the keyboard (e.g., after the finger 300 has pressed on the cover 104 with a force that satisfies a force threshold). The second actuator 206 imparts a force on the cover 104 that causes the cover 104 to move in the direction of arrow 302. The second actuator 206 may then reverse the direction of the force, causing the cover 104 to move in the direction of arrow 304 (FIG. 3C). The motion of the cover 104 may be a wholesale motion of the cover 104 (e.g., the cover moves, even if only microns in either direction), or it can correspond to motion caused by a vibration or oscillation propagating through the cover 104 in the directions of the arrows 302, 304 (which may not result in a translation of the cover 104).

FIGS. 2 and 3A-3C illustrate actuators that impart forces that are in-plane (e.g., substantially parallel) to a top member of the keyboard 100. However, other types of actuators may be used instead or in addition to those described above. For example, FIGS. 4A-4C depict an example of the keyboard 100 where an actuator causes the top member to move in a direction that is out-of-plane with the input surface of the top member (e.g., perpendicular to the direction of a force input).

Figure 4A:
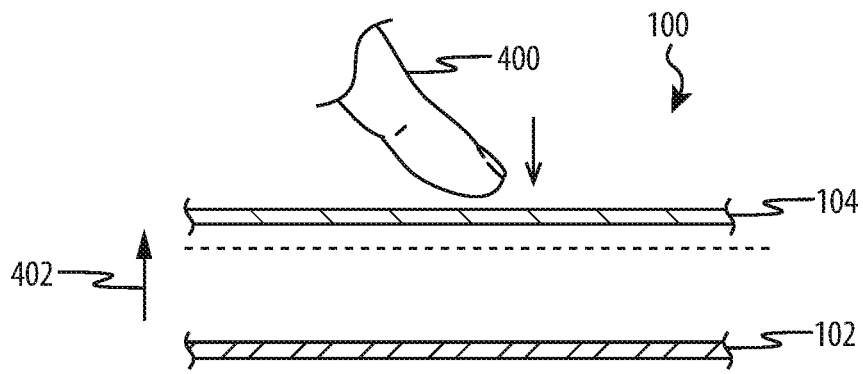
FIGS. 4A-4C depict simplified cross-sectional views of the input device of FIG. 2 showing another example haptic output.
Figure 4B:
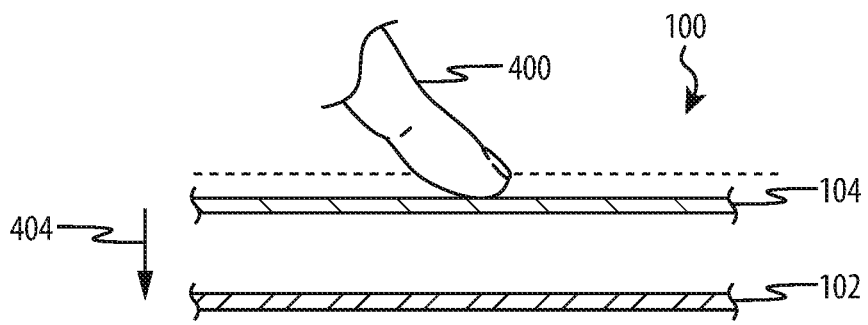
Figure 4C:
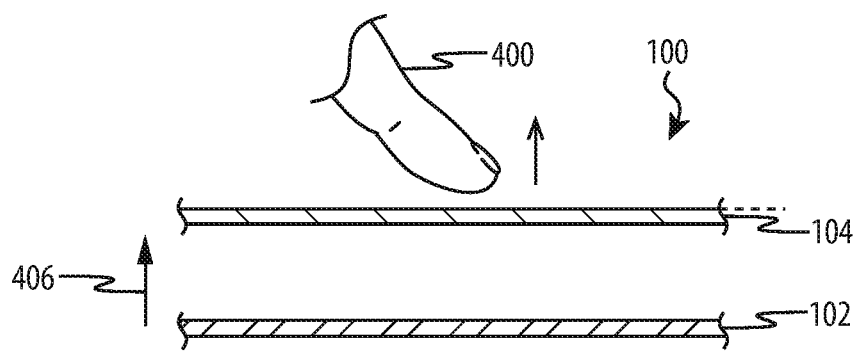

FIGS. 4A-4C depict a partial cross-sectional area of the keyboard 100, viewed along line B-B in FIG. 2, illustrating an out-of-plane haptic output that may be produced by an actuator. As depicted in FIG. 4A, when a finger 400 is detected approaching the cover 104 (e.g., by a capacitive touch sensing system), the cover 104 may be moved upward (indicated by the arrow 402) by an actuator. As the finger 400 continues its downward motion, the actuator may permit or cause the cover 104 to move downward, as indicated by the arrow 404 in FIG. 4B. Once the finger 400 moves a threshold distance or releases downward pressure, the actuator may move the input surface upward (indicated by the arrow 406 in FIG. 4C), which may return the input surface to its original position or move it further upward.

In embodiments where the whole cover 104 moves (e.g., as described with respect to FIGS. 3A-3C and 4A-4C), the cover 104 may be suspended relative to the enclosure 102 by a suspension system (not shown). The suspension system may take many forms, and may include springs, foams, compliant members or materials, or other mechanisms that allow the cover 104 to move relative to the enclosure 102 to provide a haptic output.

In some embodiments, a subset of the movements depicted in FIGS. 4A-4C may be implemented. For example, in response to a force input, an actuator may cause the cover 104 to "pop" or deflect upwards as depicted in FIG. 4A and quickly return. As another example, the actuator may instead cause the cover 104 to deflect downward as depicted in FIG. 4B and quickly return as depicted in FIG. 4C in response to the force input.

The haptic outputs described with respect to FIGS. 2-4C are examples of actuators that produce global haptic outputs, or haptic outputs that affect or can be felt across the entire surface of the keyboard 100. In some cases, local haptic outputs may be used instead of or in addition to global haptic outputs. For example, FIGS. 5A-5C depict a partial cross-sectional area of the keyboard 100, viewed along line B-B in FIG. 2, illustrating a local haptic output that may be produced by an actuator or a combination of actuators.

Figure 5A:
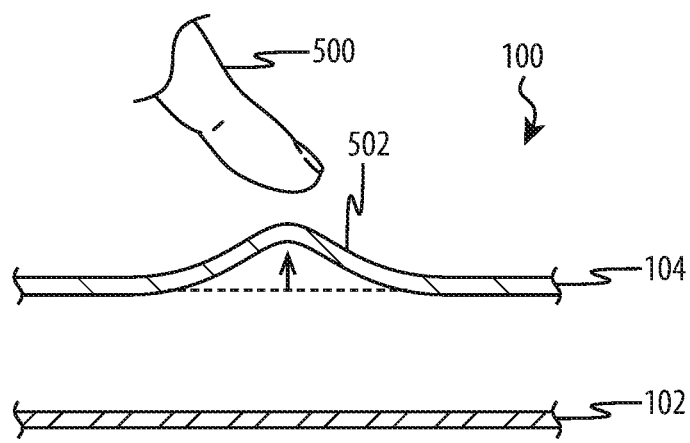
FIGS. 5A-5C depict simplified cross-sectional views of the input device of FIG. 2 showing yet another example haptic output.

As shown in FIG. 5A, as a finger 500 approaches an input region 502 of the cover 104, a sensor such as a touch or proximity sensor may detect the presence and/or approach of the finger 500. Once the finger 500 is detected approaching, an actuator may cause the input region 502 of the cover 104 to move upward to meet the finger 500. For example, an electromechanical or piezoelectric actuator operatively coupled to the cover 104 may be actuated to cause a localized deflection of the input region 502. The actuators that locally deform the cover 104 may be any suitable actuator, such as electromechanical actuators, piezoelectric actuators (e.g., piezoelectric actuators coupled directly to the cover 104, piezo benders below the cover 104 that locally deform the cover 104), linear actuators, voice coil motors, Lorentz force actuators, electro-active polymer actuators, and so on.

Figure 5B:
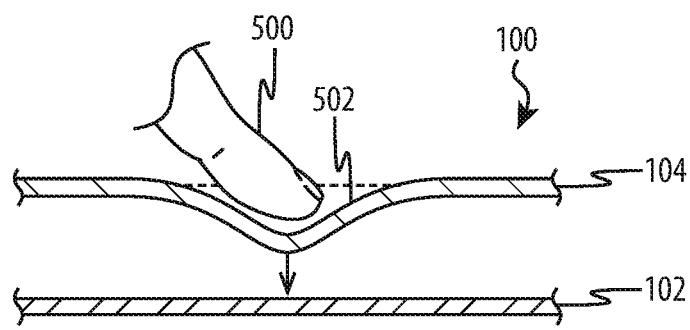

As the finger 500 continues to press downward, the actuator may allow the input region 502 to move downward as depicted in FIG. 5B. As depicted in FIG. 5C, once the finger 500 moves a threshold distance or releases downward pressure, the actuator may cause the input region 502 to move upward again, whether returning the input region 502 to its original position or moving further upward. Whether the movements depicted in FIGS. 5A-5C are implemented individually or together, they may provide to a user the sensation of a click or motion similar to a key or button press. In some embodiments, multiple such input regions 502 may be defined and separately controllable across the cover 104 to provide localized feedback across the input surface defined by the cover 104 (or other top member).

Figure 5C:
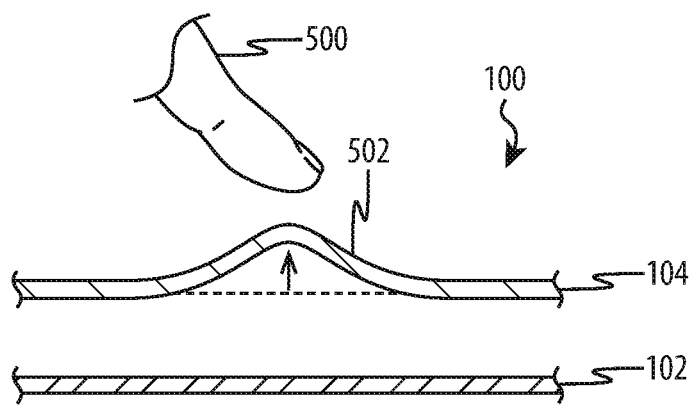

As noted above, in some embodiments, a subset of the movements depicted in FIGS. 5A-5C may be implemented. For example, in response to a force input, an actuator may cause the input region 502 to "pop" or deflect upwards as depicted in FIG. 5A and quickly return. As another example, the actuator may instead cause the input region 502 to deflect downward as depicted in FIG. 5B and quickly return as depicted in FIG. 5C in response to the force input.

Figure 6A:
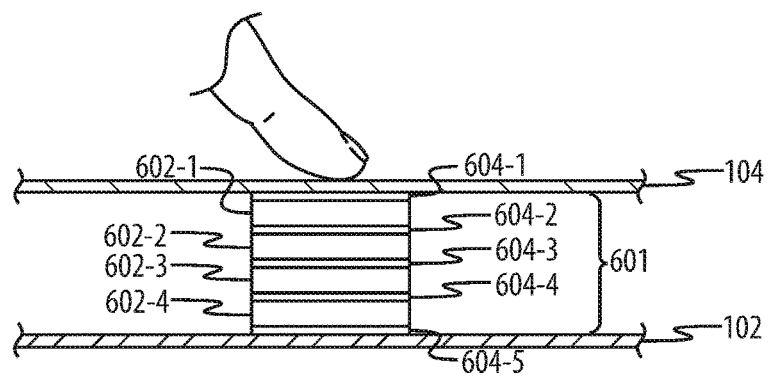
FIGS. 6A-6C depict simplified cross-sectional views of the input device of FIG. 2 showing an example haptic actuator.
Figure 6B:
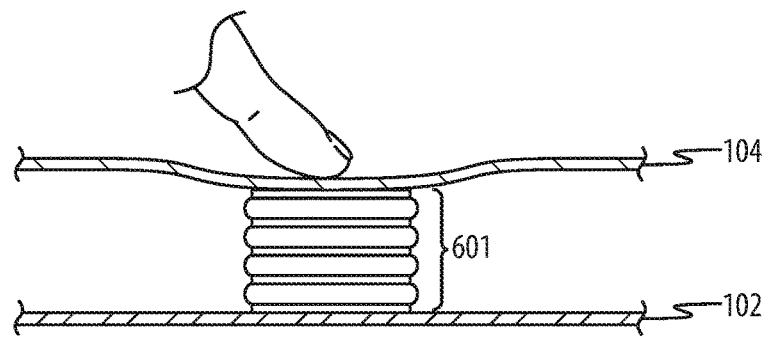
Figure 6C:
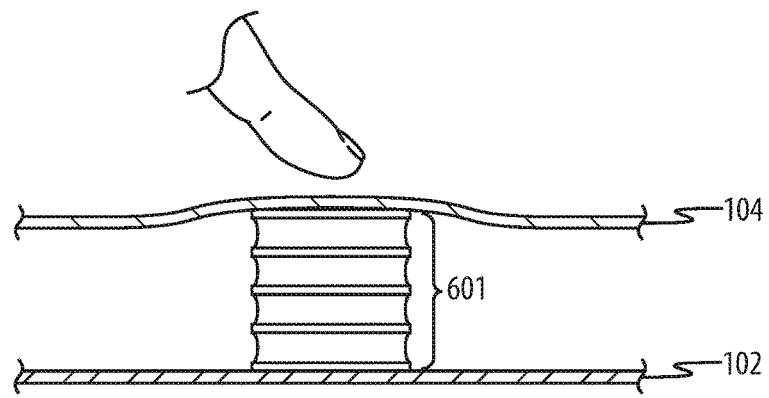

FIGS. 6A-6C depict simplified cross-sectional views of the input device of FIG. 2, viewed along line B-B in FIG. 2, showing an example haptic actuator 601 that may produce localized deformations or deflections of a cover 104. For example, the haptic actuator 601 may be configured to retract and/or extend vertically (as oriented in FIGS. 6A-6C) to impart tactile outputs to the cover 104. FIG. 6A shows the haptic actuator 601 in a resting or neutral state, while FIG. 6B shows the haptic actuator 601 in a retracted state, resulting in a localized depression of the cover 104. FIG. 6C shows the haptic actuator 601 in an extended state, resulting in a localized protrusion of the cover 104.

The haptic actuator 601 may be affixed to the cover 104 and a lower support, such as the enclosure 102, so that when the haptic actuator 601 retracts (e.g., is shortened vertically), the haptic actuator 601 pulls down on the cover 104 and locally deforms and/or deflects the cover 104. The haptic actuator 601 may be affixed to the cover 104 and the enclosure 102 (or any other suitable component or structure) with an adhesive, such as a pressure or heat sensitive adhesive, epoxy, glue, or the like.

The haptic actuator 601 may include electrode layers 604 (e.g., 604-1, . . . , 604-$n$) interleaved with compliant layers 602 (e.g., 602-1, . . . , 602-$n$). In order to produce haptic outputs, and in particular to retract or shorten the actuator 601, the electrode layers 604 may be selectively electrically charged such that the electrode layers (e.g., adjacent electrode layers) are attracted to one another. For example, a first electrode layer 604-1 may be positively charged and a second electrode layer 604-2 may be negatively charged, thus causing the first and second electrode layers 604-1, 604-2 to be attracted to one another. This attraction force may result in a first compliant layer 602-1 being deformed as the first and second electrode layers 604-1, 604-2 are drawn together by the attractive force between the electrodes (e.g., an electrostatic force). Similar charges may be applied to other electrode layers 604 to cause the whole haptic actuator 601 to retract. On the other hand, to extend the haptic actuator 601 to produce an upwards force on the cover 104 (e.g., to form a protrusion), the electrode layers 604 may be electrically charged with a same or similar charge, causing the electrode layers 604 to repel one another. For example, all of the electrode layers 604 may be positively charged. The resulting repulsive force (e.g., electrostatic repulsion) may cause the compliant layers 602 to stretch vertically, thus producing a localized protrusion or deformation in the cover 104.

The haptic actuator 601 may be configured to produce various types of haptic outputs. For example, the haptic actuator 601 may be repeatedly pulsed to produce a vibration, or it may be actuated once to produce a deformation in one direction followed by a return to a neutral state, producing a single "pop" type haptic output. These and other types of haptic outputs may include retractions of the haptic actuator 601, extensions of the haptic actuator, or both types of movements. For example, a vibration may be produced by cyclically applying a certain charge to the electrode layers 604 so that they are attracted to adjacent electrode layers 604, thus compressing the compliant layers 602 and retracting the actuator 601. When the charge is removed between cycles, the electrode layers 604 may produce no forces, thus letting the haptic actuator 601 return to a neutral position. Similarly, a vibration may be produced by cyclically applying a charge to the electrode layers 604 that result in the electrode layers 604 repelling one another, followed by removal of the charges to allow the haptic actuator 601 to return to the neutral position. A vibration may also be produced by alternating between attractive and repulsive charges, resulting in an alternating retraction and extension of the actuator 601. Similar modes of operation may be used to produce non-repeating haptic outputs, such as a single "pop" type output described above.

Figure 6D:
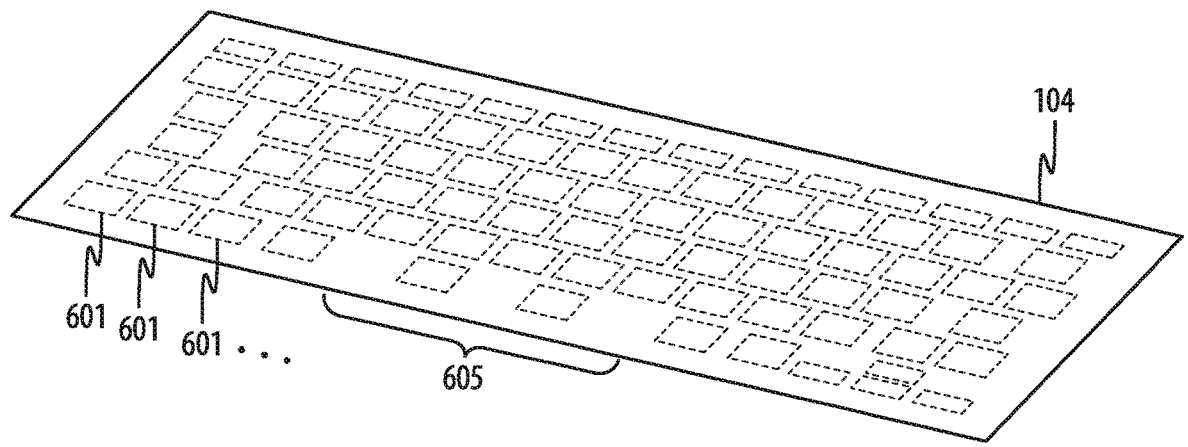
FIGS. 6D-6E depict example arrangements of haptic actuators relative to a cover of an input device.

While FIGS. 6A-6C show a single haptic actuator 601, a keyboard (e.g., the keyboard 100) or other input device or device may include multiple haptic actuators 601. FIG. 6D shows an example arrangement of haptic actuators 601 relative to the cover 104. In particular, FIG. 6D shows haptic actuators 601 arranged in a keyboard pattern in which at least one actuator 601 is beneath each input region (which may correspond to keys of a keyboard layout). For example, a single actuator 601 may underlie each letter and number key, while some input regions, such as a region 605 that may correspond to a space bar, may include multiple actuators 601. In some cases, instead of mapping actuators 601 to particular input regions, as shown in FIG. 6D, the actuators 601 may be arranged in a grid pattern. Alternatively, the keyboard 100 may include a discrete haptic actuator 601 for each of a subset of keys, while other keys share a haptic actuator 601. For example, each letter and number key of the keyboard 100 may correspond to a different haptic actuator 601, while other groups of non-letter keys, such as a tab key, caps lock key, left-shift key, and left control key, may share a common haptic actuator 601.

Figure 6E:
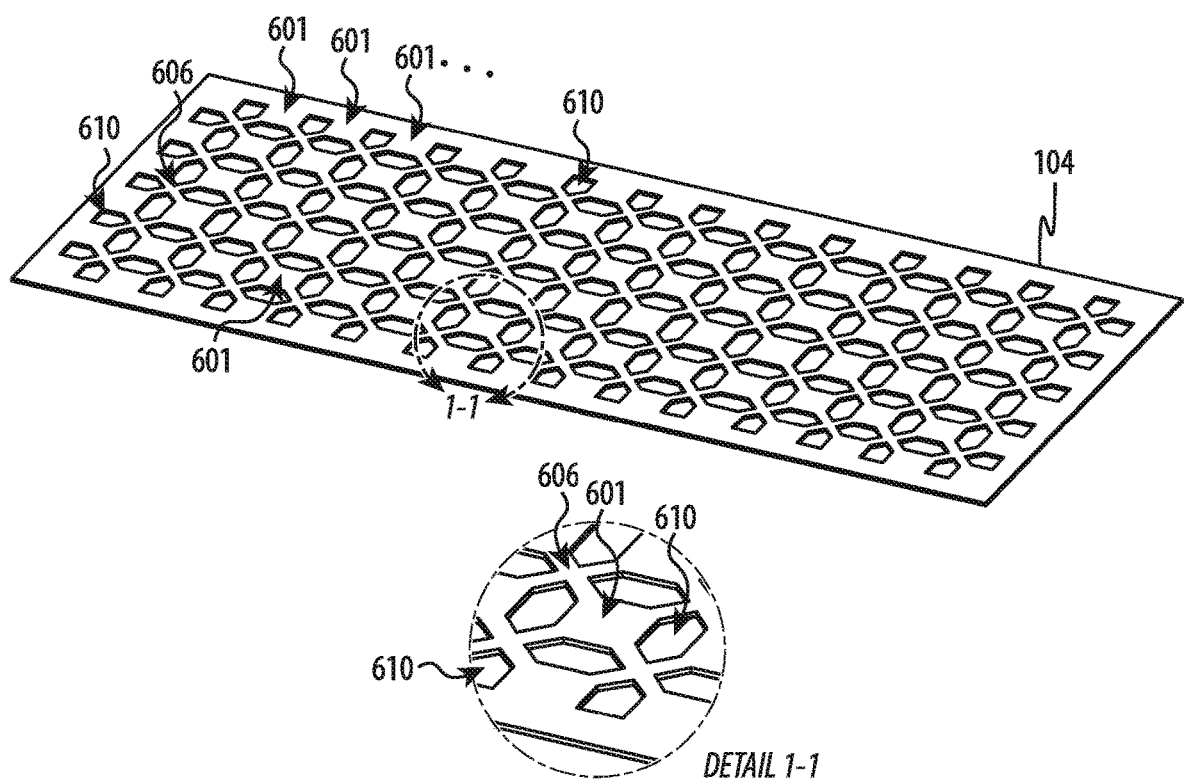

FIG. 6E shows another example arrangement of haptic actuators 601 relative to the cover 104. In this example, the haptic actuators 601 may be formed from a single sheet or otherwise interconnected via one or more connecting elements 606. The connecting elements 606 may be the same material that formed the compliant layers 602 of the actuators 601 themselves. In some cases, the haptic actuators 601 and the connecting elements 606 may be an integrated structure. For example, the haptic actuators 601 and the connecting elements 606 may be formed by cutting continuous sheets of compliant material to form the actuators 601, the connecting elements 606, and gaps 610. Such sheets may then be laminated with the electrodes 604 to form a unitary sheet of actuators 601 and connecting elements 606. While the connecting elements 606 may join the haptic actuators 601 into a single common structure, the connecting elements 606 may omit the electrode layers 604. This configuration can maintain electrical isolation of the actuators 601 to allow independent actuation of the actuators 601.

The gaps 610 may provide clearance around the haptic actuators 601 to allow lateral deformation of the actuators 601 when the actuators are compressed. In some cases the gaps 610 are free space (e.g., air), while in other cases another material is introduced into the gaps, such as a material that is more compliant than the compliant layers 602 (and therefore allow lateral deflection of the compliant layers 602).

The connecting elements 606 may provide several benefits. For example, they may provide additional structural support to the cover 104 by providing less unsupported area between adjacent actuators 601. Further, they may help isolate or localize deflections produced by force inputs and/or key selections, which may improve local force and/or touch sensing functions. For example, it may improve the resolution with which a force sensing system can detect the location of a force input.

As shown in FIGS. 6A-6C, the haptic actuator 601 is used to produce localized haptic outputs. For example, the cover 104 is shown locally deflecting or deforming in response to an extension or retraction of the haptic actuator 601. Such protrusions and depressions in the cover 104 may be facilitated by a cover 104 that is sufficiently flexible to produce local deformations and/or deflections. For example, where the cover 104 is glass, the glass may have an elastic modulus in a range of about 60 to 80 GPa, and a thickness in a range of about 0.1 mm to 0.5 mm. Other dimensions, properties, and materials (e.g., plastic, fabric, metal) are also possible. Further, the cover 104 may be reinforced or stiffened in certain areas to help isolate deformations and/or deflections produced by the haptic actuator 601. For example, ribs may be formed on or applied to the bottom of the cover 104 between various haptic actuators 601. The ribs may extend to another structure, such as the enclosure 102, or they may extend only partially to another structure (such as the ribs 1007 shown in FIGS. 10B and 11B).

The haptic actuator 601 may be configured to produce global haptic outputs, such as those described with respect to FIGS. 4A-4C. In such cases, the cover 104 may be configured to resist or minimize local deformations or deflections, such that the forces applied by the haptic actuator 601 may be perceived anywhere on the cover 104 (or at least over a greater area than that of the haptic actuator itself). For example, the cover 104 may be thicker and/or stiffer than a cover 104 used for localized haptic outputs. More particularly, the cover 104 may be glass having a thickness in a range of about 0.75 to 2.0 mm. Alternatively, the cover 104 may be metal, plastic, or the like. Further, where global haptic outputs are used, a device may include multiple haptic actuators 601, which may be operated simultaneously or individually.

The haptic actuator 601 may include any suitable number of compliant layers 602 and electrode layers 604. For example, the haptic actuator 601 may include 40 compliant layers 602 and 41 electrode layers 604, with each compliant layer 602 sandwiched between two electrode layers 604. The electrode layers 604 may be formed of or include any suitable material, such as gold, aluminum, copper, indium tin oxide (ITO), or the like. The compliant layers 602 may likewise be formed of or include any suitable material such as silicone, latex, elastomers, polymers, gels, or any other compliant material. The compliant layers 602 may be any suitable thickness, such from about 10 microns to about 50 microns thick. In some case they are about 25 microns thick. When viewed from the top, the actuator 601 may have any suitable shape, such as square, rectangular, round, or the like. In some cases, when viewed from the top (e.g., through the cover 104) the actuator 601 has length and width dimensions of about 40×40 mm, about 25×25 mm, or about 15×15 mm. In some cases, the actuator 601 has substantially the same dimensions as an input region (e.g., a virtual key) that it underlies. Other dimensions are also contemplated.

Haptic actuators 601 may be arranged in a keyboard 100 (or other input device) in any suitable manner. For example, Any of the foregoing haptic outputs may be produced in response to the keyboard 100 detecting a force input that satisfies a threshold (e.g., a force threshold). In particular, the haptic outputs may be used to indicate to a user that they have pressed the keyboard 100 with enough force to register the input. In this way, the keyboard 100 may induce a sensation that mimics or suggests the action of a mechanical keyboard, with the haptic output representing the sensation of a collapsing mechanical key. Moreover, properties of the haptic output or outputs used by the keyboard 100 may be selected or optimized to provide a tactile feeling that is similar to that of a collapsing mechanical key. In some cases, the haptic outputs may not be produced in response to inputs corresponding to incidental contact due to fingers resting on the keyboard 100, low-force inputs due to touch inputs to the keyboard 100 (e.g., when the input surface is being used as a trackpad), or the like.

As noted above, a keyless keyboard, such as the keyboard 100, may include one or more force sensing systems that facilitate detection of user inputs. As used herein, a force sensing system corresponds to any combination of mechanisms and associated processors, software, etc. that can determine an amount of force applied to a surface or to a portion thereof. force sensing systems may include one or more force sensing elements, such as piezoelectric elements, strain gauges, optical displacement sensors, or the like.

In some embodiments, a single force sensing system may be used to determine an aggregate amount of force applied to the cover 104 (e.g., global force sensing). However, this type of force sensing system may provide insufficient information to determine a location of the physical contact that is producing the detected force. (Or it may not be able to determine the location to a suitable resolution.) Accordingly, where global force sensing is used, a touch sensing system may be used to determine the location of each contact between a user's finger (or other implement or input member) and the cover 104. Accelerometers may also be used in conjunction with the touch sensing system and the force sensing system to determine the location of a force input. For example, one or more accelerometers, and associated processors, may detect vibration or motion signatures that are indicative of an input from a particular finger or at a particular location on the input surface of the keyboard 100. Together, a touch sensing system and a global force sensing system (and, optionally, accelerometers) may be used to determine when and where a user is attempting to apply an input on the surface of the keyboard 100.

In other embodiments, multiple force sensing systems (or multiple force sensing elements associated with a single force sensing system) may be used to determine an amount of force applied to discrete areas or known locations on the cover 104. For example, in some cases, each input region 106 of the keyboard 100 (e.g., corresponding to the size and/or location of a traditional key such as a character input key) is associated with its own unique force sensing system or force sensing element. In other words, each key is separately monitored to detect force inputs. In some cases, instead of monitoring the force of each individual key, the keyboard 100 is divided into multiple force sensing regions or pixels, at least some of which include multiple keys. In particular, based on typical typing patterns, there may be groups of keys that are unlikely to be contacted simultaneously. For example, a user may rest his or her fingers along a "home row" or a central row of keys, and move his or her fingers away from the home row to strike individual keys. Because of the horizontal positioning of a user's fingers relative to the keyboard, it is less likely that a user will be touching multiple keys in a single column at any given time. As a more specific example, on a traditional "QWERTY" keyboard, a user's fingers may be resting on the "a" key while striking the "f" key, but it is less likely that the user's fingers will be resting on the "a" key while striking the "q" key. Accordingly, it may be possible to increase the precision of a force-sensitive keyboard by providing force sensing pixels (as opposed to a global force sensing system, for example) without resorting to a different force sensing system or force sensing element for each key.

Such force sensing pixels may encompass different groups of input regions and may detect forces substantially independently of one another. For example, a force input applied to one force sensing pixel may be detected by a force sensing system (or element) associated with that force sensing pixel, but may not be detected by a force sensing system (or element) associated with a different force sensing pixel (or it may not satisfy a detection threshold of the second force sensing system or element). In some cases, each force sensing pixel (and/or a force sensing element associated with each force sensing pixel) produces a force value distinct from each other force value. For example, a processor may use a first force sensing system or element associated with a first force sensing pixel (independently of a second force sensing system or element that is associated with a different force sensing pixel) to determine the force applied to the first force sensing pixel. Similarly, the processor may use the second force sensing system or element associated with the second force sensing pixel (independently of the first force sensing system or element) to determine the force applied to the second force sensing pixel. Accordingly, each force sensing pixel can be independently evaluated to determine whether a force input has been applied to that particular force sensing pixel and/or the amount of force applied to the particular pixel.

Figure 7A:
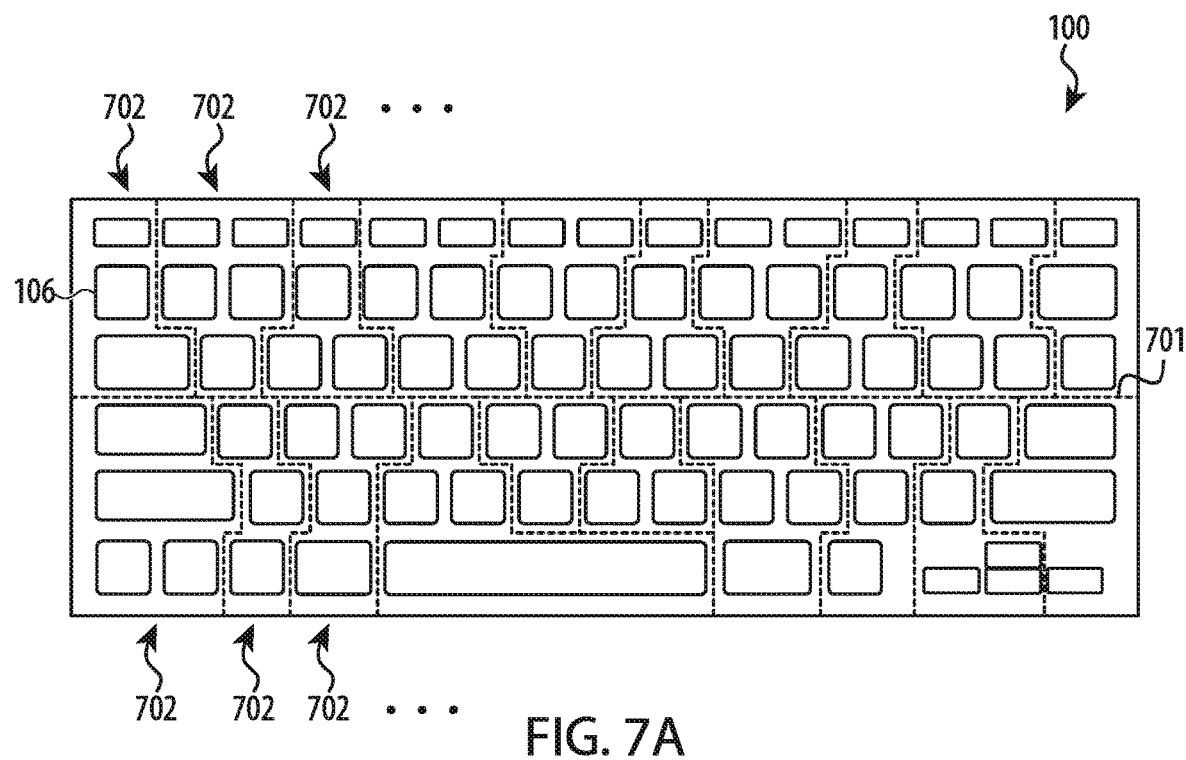
FIGS. 7A-7B depict an input device with example force sensing regions.
Figure 7B:
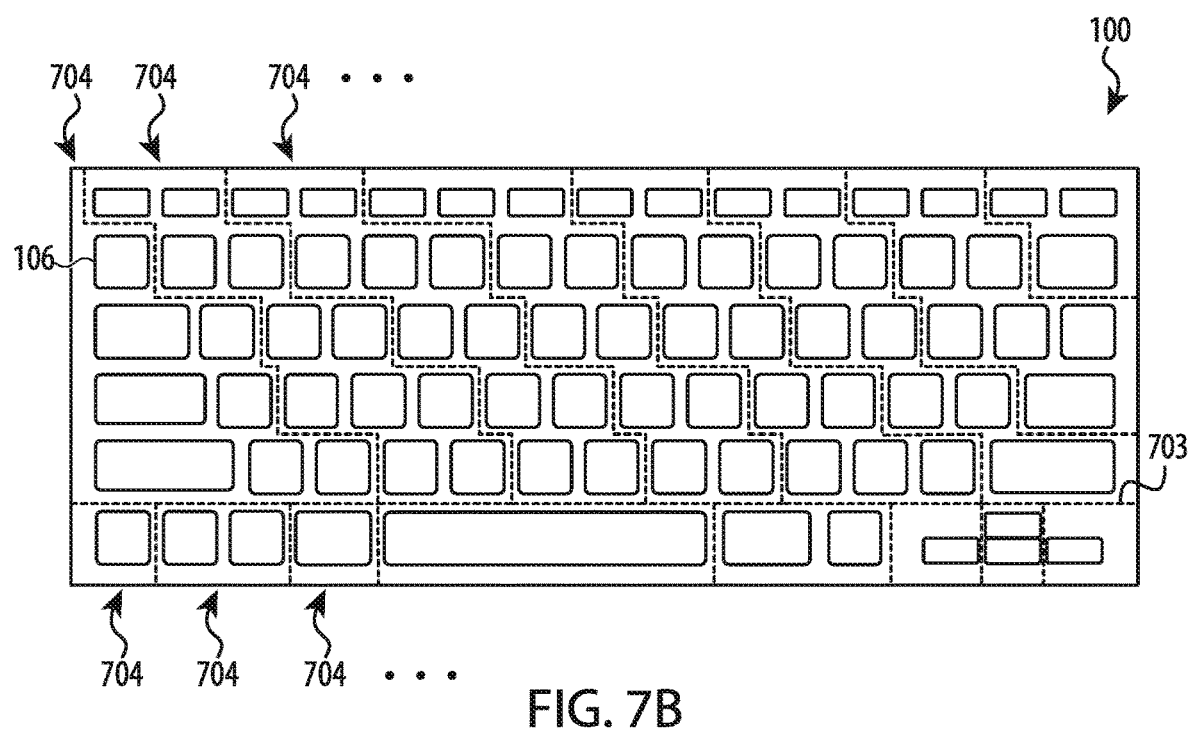

FIGS. 7A-7B depict the keyboard 100 with different example force sensing regions or force pixel arrangements. In FIG. 7A, force sensing regions 702 (or pixels) are arranged in substantially two rows, with a first row above line 701 and a second row below line 701. The line 701 divides the keyboard roughly in half lengthwise, and there are ten force sensing regions 702 in each row. In FIG. 7B, force sensing regions 704 are also arranged in substantially two rows, with a first row above line 703 and a second row below line 703. FIG. 7B includes eight force sensing regions 704 in each row. The force sensing regions 704 may be oriented substantially diagonally (with respect to a longitudinal axis of the keyboard extending from left to right in FIG. 7B). This arrangement may correspond to a typical typing pattern, where each particular finger tends to be used to press keys in diagonal groupings.

In some embodiments, such as those shown in FIGS. 7A-7B, each row includes at least eight force sensing regions. In this way, each row includes at least a separate force sensing region for each area that is accessible by (or typically struck by) a particular finger (excluding thumbs in the case of the eight pixel arrangement). Moreover, at least a subset of the force sensing regions 702, 704 encompass groups of at least two separate input regions/keys (e.g., the force sensing regions are configured to detect a force applied to at least two separate input regions/keys).

The arrangement of the force sensing regions in FIGS. 7A-7B, including which keys are encompassed by each force sensing region, are merely examples. In various embodiments, force sensing regions may encompass different input regions (e.g., keys) than those shown in these figures.

The force sensing regions 702 (FIG. 7A) and 704 (FIG. 7B) may each correspond to one force sensing system or element. That is, a force applied to anywhere in the force sensing regions 702, 704 may result in a single force value without regard to the location of the force. As noted above, the force sensing system or element may use any suitable force sensing technology and/or technique, including capacitive force sensing, piezoelectric force sensing, strain gauges, or the like. The force sensing system or element for each force sensing region 702, 704 may be located below the force sensing region and within the enclosure 102 of the keyboard 100. The cover 104 may be segmented along the borders of the force sensing regions 702, 704 to allow each force sensing region to move at least somewhat independently of one another. In some embodiments, the cover 104 is grooved along the borders of the force sensing regions 702, 704 (e.g., on the bottom surface or the top surface). The grooves may allow the force sensing regions 702, 704 to move substantially independently of one another and may reduce the extent to which one force sensing region deflects in response to a force applied to an input region in a neighboring force sensing region. This may improve the independence of the force detected at each force sensing region.

The force sensing systems or elements associated with each force sensing region (e.g., the regions 702, 704) may be configured to detect key presses in response to different force values. For example, force inputs detected in the force sensing regions may be compared against different force thresholds. Thus, force sensing regions that are typically subjected to lower forces, such as those typically struck by a user's pinky finger, may use a different (e.g., lower) force threshold than those regions typically struck with greater force, such as those typically struck by a user's index finger or thumb.

Figure 8A:
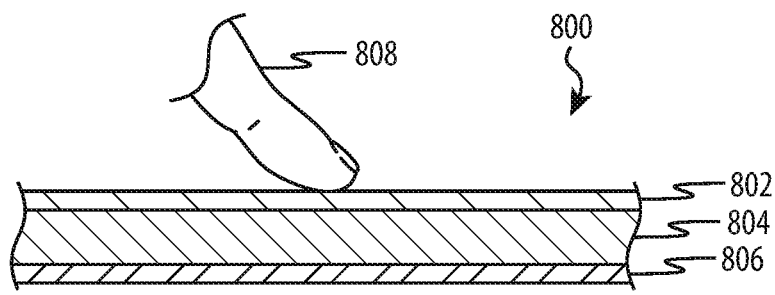
FIGS. 8A-8C depict simplified cross-sectional views of a force sensing system.
Figure 8B:
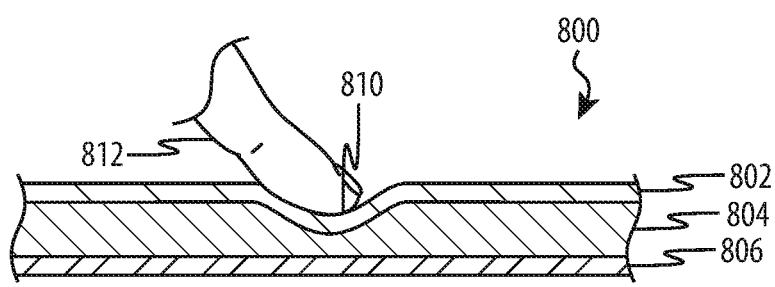
Figure 8C:
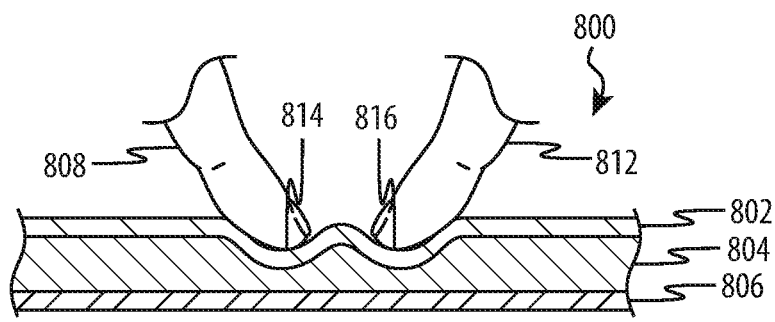

FIGS. 8A-8C show partial cross-sectional views of the keyboard 100 (e.g., viewed along line A-A in FIG. 1), illustrating an example localized force sensing system 800 that may be used in conjunction with the embodiments described herein. As described herein, the force sensing system 800 may provide localized force sensing such that both the force and location of individual force inputs from a finger, stylus, or other implement or input member may be determined. Moreover, the resolution of the force sensing system 800 may be substantially equal to or greater than the resolution of the input regions, such that each force input can be reliably associated with a given input region.

The force sensing system 800 may include a cover 802 (corresponding to the cover 104 in FIG. 1, for example), a compliant material 804, and a capacitive sense layer 806. The cover 802 may define an input surface, as described above with respect to the cover 104. The force sensing system 800 determines a force by detecting a change in capacitance caused by a changing proximity of the user's finger 808 (or other implement or input member) to the capacitive sense layer 806. In particular, the cover 802 may locally deform or deflect in response to applied force inputs, thereby compressing or otherwise deforming the compliant material 804 and allowing the user's finger 808 (or any other implement or input member that capacitively couples to the capacitive sense layer 806) to move closer to the capacitive sense layer 806.

The deflection and/or compression behavior of the compliant material 804 and/or the cover 104 may be modeled so that a processer associated with the force sensing system 800 can determine an amount of force of a given force input. In particular, known forces may be applied to the cover 802 in various locations to determine the change in capacitance resulting from a given amount of force applied to a given location. This information may be stored in a table, as an equation representing a force versus capacitance curve, or in any other data structure or algorithm that can be used to correlate a capacitance value with a force value.

Instead of or in addition to capacitive sensors, other types of sensors may be used to detect a change in distance between the cover 802 and a lower layer. For example, the capacitive sense layer 806 may be replaced (or may be supplemented) by an array of optical displacement sensors that detect local deformations of the cover 802. Where distance or displacement sensors are used, known forces may be applied to the cover 802 in various locations to determine the sensor values that result from a given amount of force applied to a given location. This information may be stored in a table, as an equation representing a force versus displacement curve, or in any other data structure or algorithm that can be used to correlate a change in displacement or distance (as measured by the optical displacement sensors, for example) with a force value.

FIG. 8B shows the force sensing system 800 while the cover 802 is locally deformed by a finger 808 or other input member. The cover 802 may deform locally in response to a localized force input. In other words, the cover 802 is not so stiff or rigid that a finger press of a typical typing force cannot produce a local deformation or depression 810 in the cover 802. A non-local deflection of the cover 802 (e.g., a downward translation) may also occur in response to the force input.

The cover 802 may be formed from or include any suitable material, such as glass, metal, polycarbonate, sapphire, or the like. The dimensions and/or the material of the cover 802 may be selected to provide a suitable local deformation profile (e.g., diameter and depth). For example, the cover 802 may have an elastic modulus in a range of about 60 to 80 GPa, and a thickness in a range of about 0.1 mm to 0.5 mm.

The compliant material 804 may be formed from or include any suitable material, such as foam, gel, silicone, an array of compliant material dots or structures (e.g., formed from silicone), liquid, air, or the like. The compliant material 804 may support the cover 802 over a touch and/or force sensitive area of the cover 802, such as the area of the cover 802 that defines input regions (e.g., keys). For example, as shown in FIG. 1, the compliant material 804 may be positioned under substantially the entire cover 104, or only under the region on which the input regions or keys 106 are defined. The support provided by the compliant material 804 may help to isolate the effect of a force input applied to the cover 802 to a limited area of the cover 802. More particularly, when a force input, such as a finger press corresponding to a key press on the cover 802, is applied to a force sensing system that does not include the compliant material 804, the cover 802 may tend to deflect substantially globally. For example, if a force sensing system has an air gap rather than a compliant material, a finger press may deform the cover 802 all the way to the edges of the cover. On the other hand, where the compliant material 804 is included, the compliant material 804 prevents or reduces deflection or deformation of the cover 802 in areas that are not directly contacted by an object (or in the immediate vicinity).

The compliant material 804 may also provide a predictable force-versus-displacement relationship, which may be exploited by the force sensing system 800 to help determine force values for force inputs. For example, the compliant material 804 may help to improve the consistency of the force-versus-displacement response across the input surface of the cover 802, especially as compared to a force sensing system 800 that uses an air gap instead of a compliant material 804. More particularly, without the compliant material 804, a force applied near a center of the cover 802 (e.g., away from the supported edges of the cover 802) may cause more deflection of the cover 802 than the same force applied near an edge of the cover 802. The supportive effect of the compliant material 804 may help prevent or limit the amount of sagging or global deflection in response to an input force, especially away from the edges or supported areas of the cover 802. In this way, input forces applied to the center and the edges of the cover 802 (and indeed any area of the cover 802) may result in a similar deformation. Moreover, due to the large area of support provided to the cover 802 by the compliant material 804, those deformations may be more localized (e.g., smaller) than they would be without the compliant material 804, thus producing higher resolution touch and force sensing results.

The compliant material 804 may be a single continuous sheet, multiple sheet segments, or other shapes or configurations (e.g., dots, pillars, pyramids, columns, discs, or the like). The dimensions and/or the material of the compliant material 804 (or any other property, such as poisons ratio, stiffness, hardness, durometer, etc.) may be selected to provide a suitable local deformation profile in conjunction with the cover 802. For example, the compliant material 804 may have a thickness in a range of about 0.5 mm to about 2.0 mm. Where the compliant material 804 comprises multiple compliant members or materials (e.g., dots, pillars, sheets, etc.), each compliant member may have substantially the same thickness, such that the distance between the cover 802 and an underlying sense layer (e.g., the sense layer 806) is substantially the same over the area that includes input regions.

The materials and dimensions of the cover 802 and the compliant material 804 may be optimized and/or evaluated together to provide a suitable local deformation profile. In some embodiments, the cover 802 is a glass layer having a thickness of about 0.3 mm and an elastic modulus of about 70 GPa, and the compliant material 804 is a foam having a thickness of about 0.5 mm.

The local deformation characteristics of the force sensing system 800 may allow multiple adjacent force inputs to be detected and separately identified. For example, the cover 802 and the compliant material 804 may experience sufficiently distinct depressions in response to force inputs that are spaced as close as 3.0 cm (e.g., 3.0 cm or more) from each other, as measured between geometric centroids of the force inputs. In some cases, the cover 802 and the compliant material 804 may experience sufficiently distinct depressions in response to force inputs that are even closer, such as 2.5, 2.0, or even 1.0 cm from each other. FIG. 8C shows the force sensing system 800 subjected to two force inputs from two separate fingers 808, 812 (or other input members or implements). Each finger/input member produces its own depression (814, 816, respectively). The centroids of the fingers 808, 812 in FIG. 8C may be as close as 3.0 cm (or closer) to one another. As the distance between the centroids of the fingers 808, 812 increases, the respective depressions become even more distinct than shown in FIG. 8C.

Figure 9A:
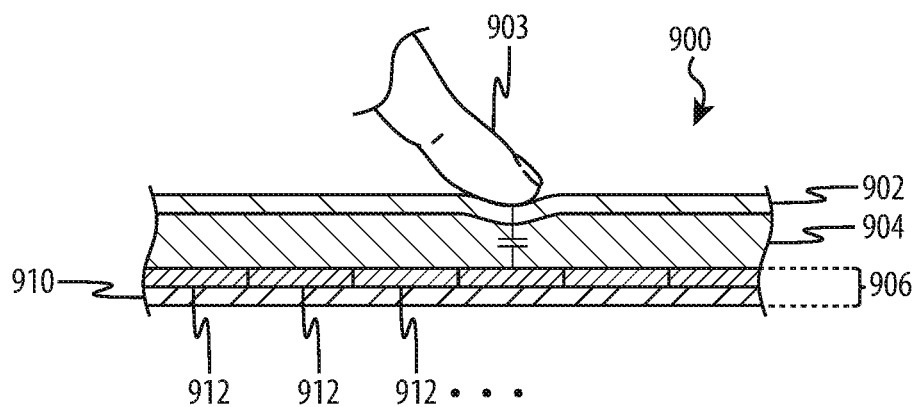
FIGS. 9A-9B depict simplified cross-sectional views of a force sensing system, showing example capacitive sensors.
Figure 9B:
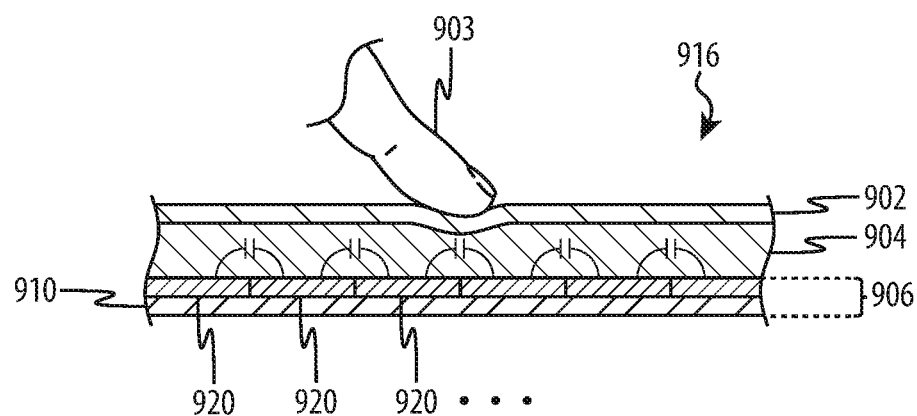

FIGS. 9A-9B show partial cross-sectional views of force sensing systems, illustrating example configurations of a capacitive sense layer. In particular, FIG. 9A illustrates a force sensing system 900, which may correspond to the force sensing system 800, that includes a cover 902 (e.g., the cover 802, 104), a compliant material 904 (e.g., the compliant material 804), and a capacitive sense layer 906 below the compliant material 904. The capacitive sense layer 906 is configured to capacitively couple directly to a user's finger 903 or other object that is brought into contact with the cover 902, such as a stylus or pen. In particular, the capacitive sense layer 906 may detect the finger 903 via self-capacitance. Because the capacitive sense layer 906 capacitively couples directly to the user's finger 903, other capacitive sense layers (such as an electrode or drive layer that capacitively couples to the sense layer 906) may not be included. More particularly, some embodiments of the force sensing system 900 may not include another capacitive sense layer between the cover 902 and the compliant material 904 (or between the cover 902 and the capacitive sense layer 906).

The capacitive sense layer 906 may include a substrate 910, such as a circuit board or flex-circuit material, and a group of electrodes 912. The electrodes 912 may be conductive traces applied to the substrate 910 and coupled to a processor and/or other electronic components that facilitate determining the capacitance changes due to the presence of the finger 903 (and thus the force). The locations of the electrodes 912 may be known so that the detection of a change in capacitance at a given electrode 912 can indicate, to a device, where on the cover 902 the force input is located.

The size of the electrodes 912 may define a resolution of the force sensing system 900. For example, the electrodes 912 may be the same size or smaller (e.g., in surface area or any other appropriate dimension) than an input region (e.g., a virtual key). In such cases, it may be possible to determine from the force sensing system 900 what key a user has selected. That is, if one or more electrodes 912 that are below a particular key (e.g., the input region 106, FIG. 1) detect a change in capacitance corresponding to a threshold force, then the force sensing system 900 and/or a device to which it is connected may register a selection of that key. Because of the resolution of such a force sensing system, it may not be necessary to use a separate touch sensing system to determine where on the input surface a force input is applied.

FIG. 9B illustrates a force sensing system 916, which may correspond to the force sensing system 800, that includes the cover 902, the compliant material 904, and a capacitive sense layer 914 below the compliant material 904. The capacitive sense layer 914 includes electrodes 920 disposed on a substrate 918 (e.g., a circuit board or flex circuit). The electrodes 920 are paired such that a capacitance between two electrodes 920 is monitored or measured, as illustrated by the capacitor symbols in FIG. 9B. When the finger 903 (or other implement) deforms the cover 902 and approaches the electrodes 920, the finger 903 changes the capacitance measured between electrodes 920 that are proximate the finger 903. In particular, the finger 903 changes the permittivity or dielectric constant of the area around the electrodes 920. The force sensing system 916 and its associated components and processors can detect the change in capacitance between those electrodes 920 to determine an amount of deformation, and thus an amount of force applied to the cover 902. Like the force sensing system 900, the force sensing system 916 may not include a second sense layer between the cover 902 and the compliant material 904.

The force sensing systems 900, 916 described above provide localized force detection, where both the location of a force input and the amount of force of the force input may be determined by the force sensing systems. Also, the resolution of the force sensing systems 900, 916 may be high enough that the locations of force inputs from individual fingers can be distinguished from one another.

Figure 10A:
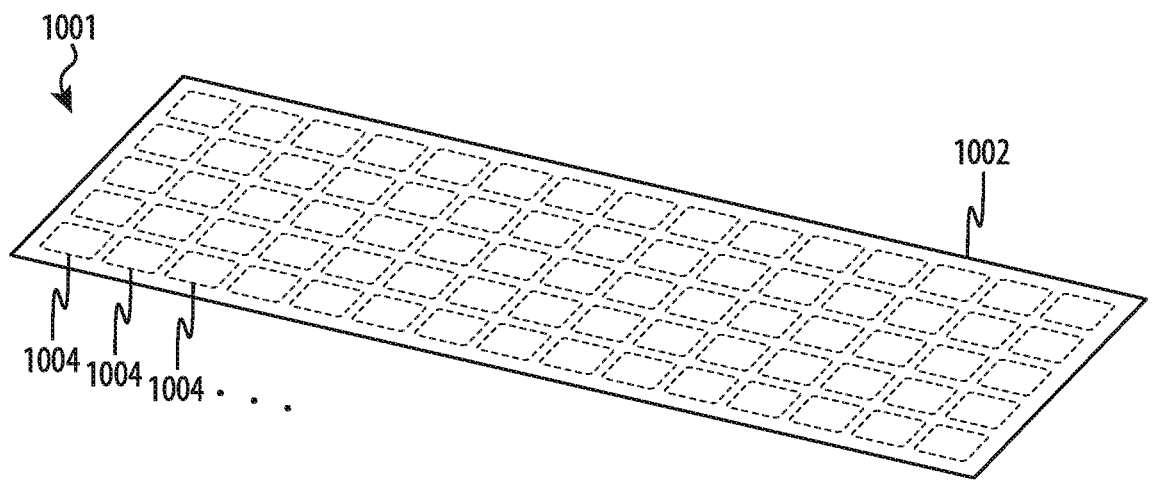
FIGS. 10A-10C depict an example localized force sensing system.
Figure 10B:
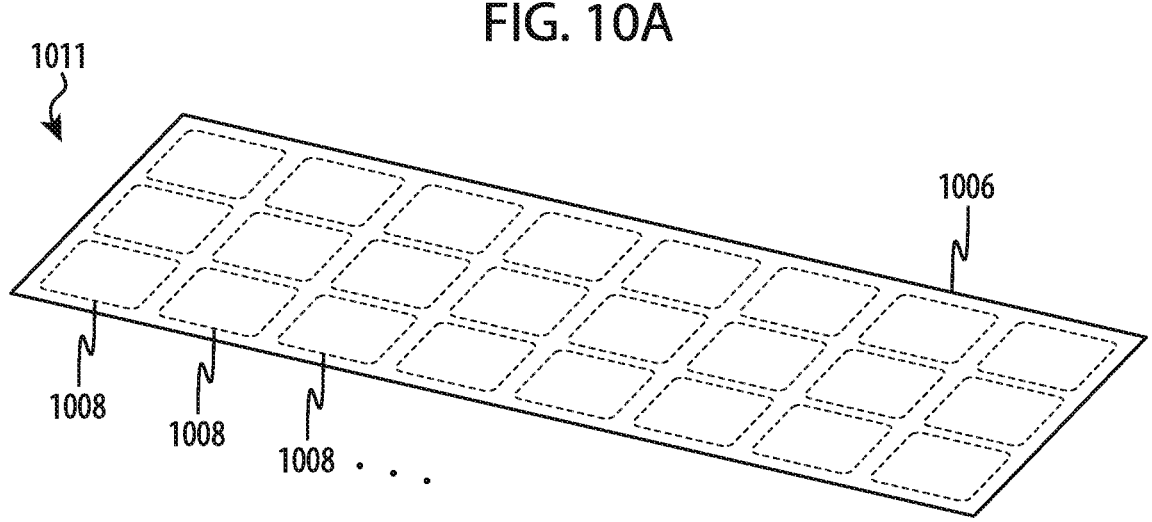
Figure 10C:
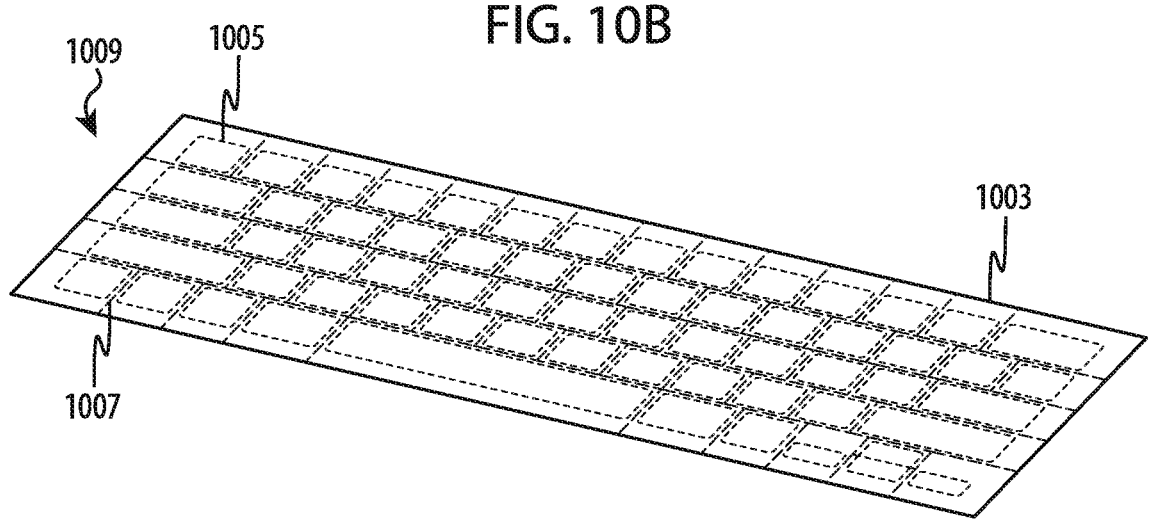

FIGS. 10A-10C show example localized force sensing system that may be used in conjunction with the keyboard 100 (or any other suitable input device or electronic device). The force sensing systems shown in FIGS. 10A-10C use strain gauges to determine an amount of force applied to an input surface. In particular, and as shown in more detail in FIGS. 11A-11B, the strain gauges can be used to determine an amount of deflection or deformation of an input surface (e.g., the cover 104), which can then be correlated to an amount of force associated with the input.

FIG. 10A shows an example force sensing system 1001 that includes a substrate 1002. The substrate 1002 may correspond to the cover 104 in FIG. 1, or it may correspond to a component that may be disposed below (e.g., coupled to a bottom of) a cover such as the cover 104. The substrate 1002 may be formed from or include any suitable material, such as glass, polymer, flexible circuit material, polyester film, or the like.

The force sensing system 1001 includes strain gauges 1004 applied to or otherwise integrated with the substrate 1002. The strain gauges 1004 may be any suitable configuration and may be formed of any suitable material. For example, the strain gauges 1004 may include a conductor having a serpentine or coil pattern (or any other suitable pattern) and disposed on a film or other substrate. In some cases, the strain gauges 1004 may include at two or more substrates or films, each having a coiled or serpentine conductor and laminated with one another. This configuration may facilitate filtering or rejection of noise, interference, or other undesirable effects on the strain gauges 1004 caused by temperature, magnetic fields, or the like.

The strain gauges 1004 may have any suitable size and may be arranged on the substrate 1002 in any suitable pattern. For example, as shown, the strain gauges 1004 may all be substantially the same size and arranged in a regular grid pattern on the substrate 1002. The strain gauges 1004 may have any suitable size as viewed from the top of the substrate 1002, such as about 10×10 mm, 15×15 mm, or any other suitable size. While the strain gauges 1004 may not be mapped directly to individual keys or input regions of a keyboard, the location of a force input on the substrate 1002 may be determined by analyzing signals from multiple (e.g., all) of the strain gauges 1004 to identify an estimated location (e.g., a centroid) of the input, regardless of where the input is applied on the substrate 1002 or other associated input surface.

In some cases, however, respective strain gauges 1004 may be positioned to correspond to respective keys or input regions. For example, FIG. 10B shows a force sensing system 1009 in which a pattern of strain gauges 1005 on a substrate 1003 essentially mimics a pattern of keys or input regions, such that each key or input region of a keyboard has at least one strain gauge 1005 disposed thereunder. Accordingly, a force measured by a given strain gauge 1005 can be used to independently determine whether a corresponding key or input region has been actuated by a user, without reference to strain gauges associated with other keys or input regions.

Where each key or input region is associated with at least one unique strain gauge, the substrate 1003 (which may correspond to the cover 104 or a component that is disposed below a cover) may include ribs 1007 formed on or otherwise coupled to the substrate 1003. The ribs 1007 may help isolate deformations and/or deflections produced by force and/or touch inputs applied to the substrate 1003 or an overlying cover, as shown and described in greater detail with respect to FIG. 11B. Where a device includes an adaptable display to produce virtual input regions at different locations on a cover 104, such ribs may be omitted to facilitate more uniform force sensing over the surface of the input surface.

FIG. 10C shows a force sensing system 1011 having a pattern of strain gauges 1008 that are larger than those shown in FIG. 10A, illustrating another example arrangement of strain gauges on a substrate for a force sensing system. While the strain gauges 1008 are larger than those shown in FIG. 10A, they may still provide suitable resolution for determining the location of a force input. For example, by detecting and analyzing signals from multiple strain gauges 1008 (e.g., to determine a centroid of a force input), it may be possible to determine the location of a force input with a resolution of +/−about 5 mm, which may be suitable for many input regions that may be shown on an input surface or displayed on an adaptable display, such as keyboard keys (e.g., virtual keys), gaming inputs, or other affordances.

Figure 11A:
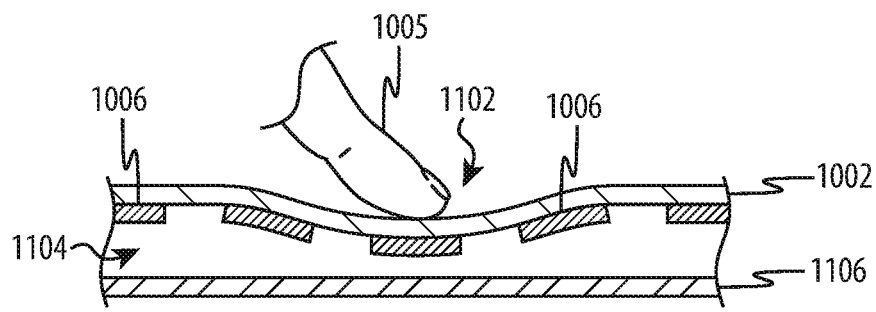
FIGS. 11A-11B depict simplified cross-sectional views of a force sensing system, showing example strain gauges.

FIG. 11A shows a partial cross-sectional view of the keyboard 100 (e.g., viewed along line A-A in FIG. 1), illustrating an example in which the force sensing system 1001 (FIG. 10A) is incorporated in the keyboard 100. As shown in FIG. 11A, a finger 1105 is applying a force to the substrate 1002 (which may correspond to the cover 104), producing a local depression 1102 in the substrate 1002. The strain gauges 1006 that are coupled to the depressed region of the substrate 1002 may produce a signal or other detectable phenomenon corresponding to the relative amount of deflection and/or strain experienced by the substrate 1002 due to the deformation. By evaluating the strain gauges 1006, a magnitude of the force input applied by the finger 1105 may be determined, as well as a location of the force input.

The keyboard 100 in FIG. 11A shows a lower component 1106, which may correspond to the enclosure 102 or another internal component or structure of an electronic device. As shown, the substrate 1002 may be separated from the lower component 1106 by a gap 1104. The gap 1104 may be empty (e.g., it may be an air gap), or it may be fully or partially filled with a material, such as a compliant material similar to the compliant material 704 described with respect to FIGS. 7A-7C (e.g., foam, gel, silicone, an array of compliant material dots or structures (e.g., formed from silicone), or the like). The compliant material may help support the substrate 1002 and may help to localize and/or isolate deflections of the substrate 1002 caused by force inputs.

Figure 11B:
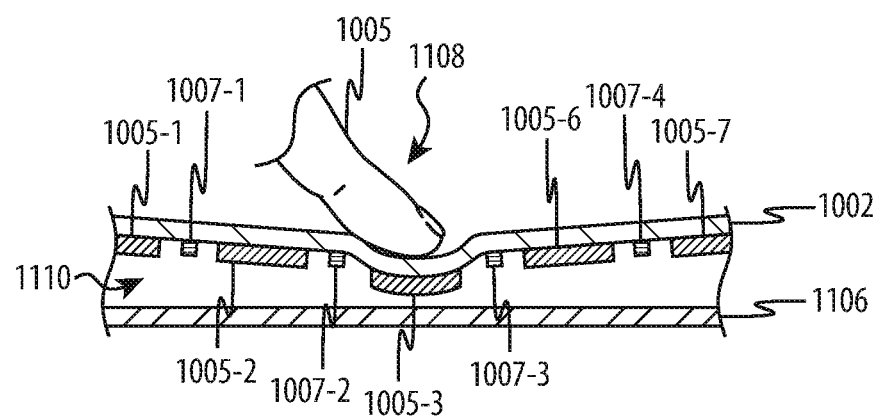

FIG. 11B shows a partial cross-sectional view of the keyboard 100 (e.g., viewed along line A-A in FIG. 1), illustrating an example in which the force sensing system 1009 (FIG. 10B) is incorporated in the keyboard 100. As shown in FIG. 11B, a finger 1107 is applying a force to the substrate 1003 (which may correspond to the cover 104), producing a local depression 1108 in the substrate 1003. As described with respect to FIG. 10B, the force sensing system 1009 may include ribs 1007 formed on or otherwise coupled to the substrate 1003. The ribs may isolate and localize deflections of the substrate 1003 caused by force inputs. For example, as shown in FIG. 11B, the force input from the finger 1107 is largely contained between the ribs 1007-2 and 1007-3. Accordingly, the strain gauge 1005-3 may be subjected to a larger strain than nearby strain gauges (e.g., strain gauges 1005-2, 1005-4), thus reducing the likelihood of false detections of key presses at nearby or adjacent keys or input regions.

The keyboard 100 in FIG. 11B shows a lower component 1112, which may correspond to the enclosure 102 or another internal component or structure of an electronic device. As shown, the substrate 1003 may be separated from the lower component 1112 by a gap 1110. The gap 1110 may be empty (e.g., it may be an air gap), or it may be fully or partially filled with a material, such as a compliant material similar to the compliant material 704 described with respect to FIGS. 7A-7C (e.g., foam, gel, silicone, an array of compliant material dots or structures (e.g., formed from silicone), or the like). The compliant material may help support the substrate 1003 and may help to further localize and/or isolate deflections of the substrate 1003 caused by force inputs.

Figure 12:
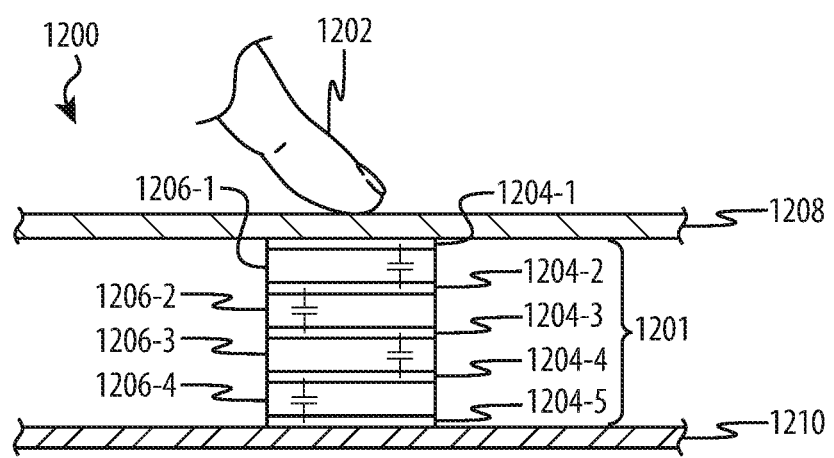
FIG. 12 depicts a simplified cross-sectional view of a force sensing system, showing an example force sensing element.

FIG. 12 shows a partial cross-sectional view of the keyboard 100 (e.g., viewed along line A-A in FIG. 1), showing a force-sensing system 1200 that uses an actuator 1201 to detect forces applied to a substrate 1208 (which may correspond to the cover 104). The keyboard 100 in FIG. 12 shows a lower component 1210, which may correspond to the enclosure 102 or another internal component or structure of an electronic device.

The actuator 1201 may correspond to the haptic actuator 601 described herein. In particular, the actuator 1201 may provide both haptic actuation functions, as described above, as well as force sensing functions. For example, the actuator 1201 (which may have the same construction as the haptic actuator 601) includes compliant layers 1206 sandwiched between electrode layers 1204. The electrode layers 1204 may be used as electrodes in a mutual-capacitance sensing scheme. For example, one electrode layer may be used as a drive electrode and another electrode layer may be used as a sense electrode. When the sense and drive electrodes are moved closer together, such as when a finger 1202 or other implement deforms the substrate 1208 and compresses the actuator 1201, a processor or other circuitry may detect resulting electrical changes, which can be correlated to an amount of force applied via the force input. More particularly, the force-sensing system 1200 may use a force versus capacitance (or other electrical phenomenon) correlation to determine the amount of force that corresponds to a measured capacitance value (or other electrical value).

In some embodiments, only two electrode layers of the electrode layers 1204 in the actuator 1201 are used for capacitive force sensing. In other embodiments, more electrode layers 1204 are used, such as all of the electrode layers. As described above, an actuator may include 40 compliant layers 1206 and 41 electrode layers 1204. In such cases, all 41 electrodes may be used for capacitive sensing. Fewer electrodes may also be used.

Notably, the actuator 1201 may detect applied forces and produce haptic outputs substantially simultaneously. For example, a haptic signal may have a relatively low frequency (e.g., between 2 and 200 Hz, though other frequencies are also possible), while a drive signal for a drive electrode of a capacitive sensor may have a relatively high frequency (e.g., between 100 and 200 kHz, though other frequencies are also possible). Accordingly, such frequencies may be applied to electrode layers of the actuator 1201 substantially simultaneously such that a haptic output is produced while electrical changes due to force inputs are also detected. Processors and/or circuitry of the force sensing system 1200 may compensate for any compression or extension of the compliant layers 1206 due to the haptic output when sensing force inputs in order to mitigate any contamination of the force measurement by the haptic output.

Where a keyboard 100 includes force sensing regions that may be struck or actuated by more than one finger (such as a single force sensing region covering an entire keyboard or the force sensing pixels described above), the force sensing system may adjust or select a force threshold based on the number of fingers that are in contact with the surface.

For example, a typical force input indicative of a user attempting to actuate a virtual key on a flat surface may range from about 25 to about 150 grams. Accordingly, when a force sensing system detects a force input above that value, it should register a selection of the virtual key. However, if a user is resting multiple fingers on the surface of the keyboard, the force sensing system may detect a non-zero baseline force. This variability in the baseline force may result in false positive detections of force inputs, effectively lowering the amount of force necessary to trigger an input. As one example, if the baseline force due to three fingers resting on a keyboard is 20 grams, simply resting a fourth finger on the keyboard may be enough to cause the device to falsely identify a force input.

Figure 13:
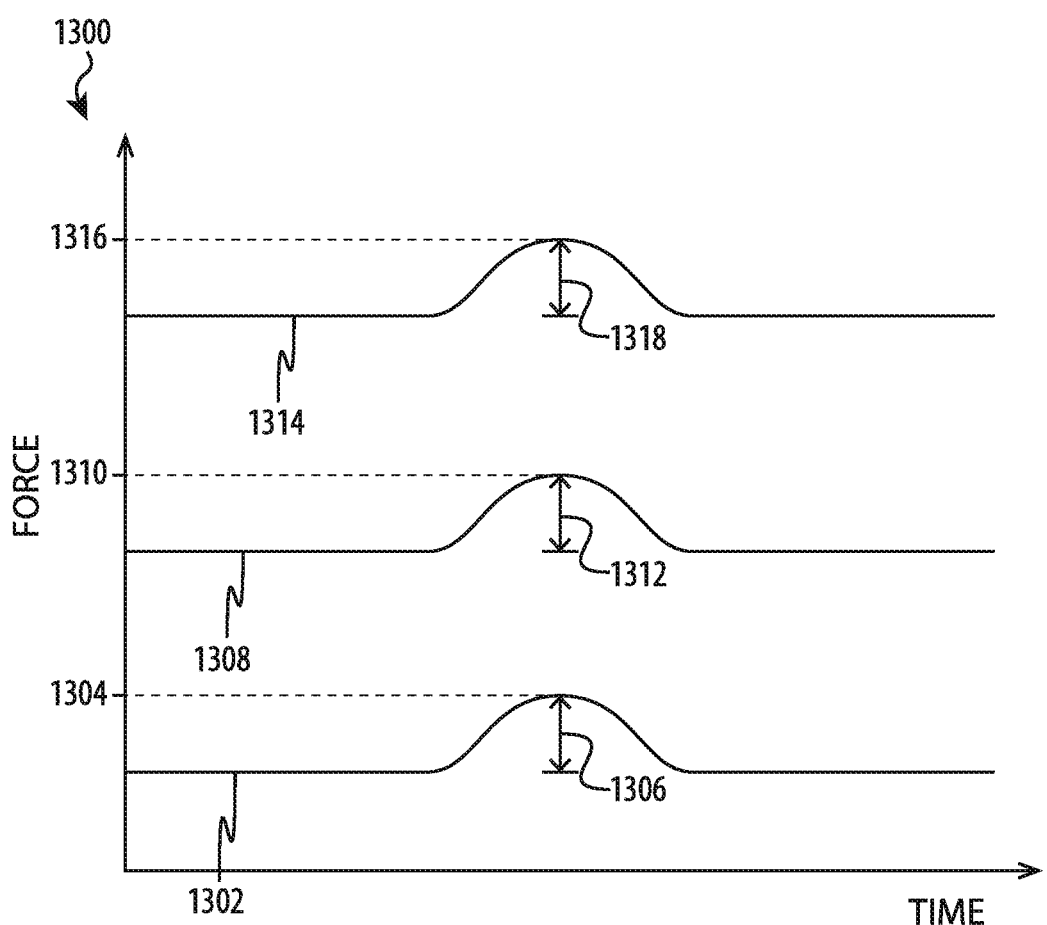
FIG. 13 is a graph illustrating example force thresholds.

Accordingly, the force sensing system may dynamically determine the force threshold that is indicative of a key press based on the number of fingers in contact with an input surface of the keyboard at a given time. FIG. 13 illustrates a graph 1300 showing three example baseline forces and force thresholds based on different numbers of fingers in contact with an input surface (e.g., the cover 104). In particular, the baseline force 1302 may correspond to a force of one finger resting on the surface. The force threshold is then set at a certain value 1306 above the baseline force 1302, resulting in the force threshold 1304. Similarly, the baseline force 1308 may correspond to a force of two fingers resting on the surface, and the force threshold may be set at a certain value 1312 above the baseline force 1302, resulting in the force threshold 1310. Where three fingers are determined to be resting on the surface, the force threshold may be set at a certain value 1318 above the baseline force of 1314, resulting in the force threshold 1316. In some cases, the force threshold is set between about 25 to about 150 grams higher than the baseline force, such as about 30 grams above the baseline force, regardless of the value of the baseline force. In other situations, the force threshold may be set to different amounts above the baseline force, depending on the number of fingers that are in contact with the surface.

The baseline forces 1302, 1308, and 1314 may be determined based on the number of fingers resting on the input surface of a keyboard. For example, the baseline force corresponding to one finger resting on the surface may be determined to be 10 grams. Thus, when one finger is detected on a surface, the baseline force may be 10 grams regardless of any actual detected force applied to the surface. Similarly, when two fingers are detected on the surface, the baseline force may be 20 grams, and so on. Accordingly, the force threshold may be determined at any given time based on the number of fingers in contact with the input surface and without regard to an actual amount of force being applied to the surface by the fingers.

Figure 14:
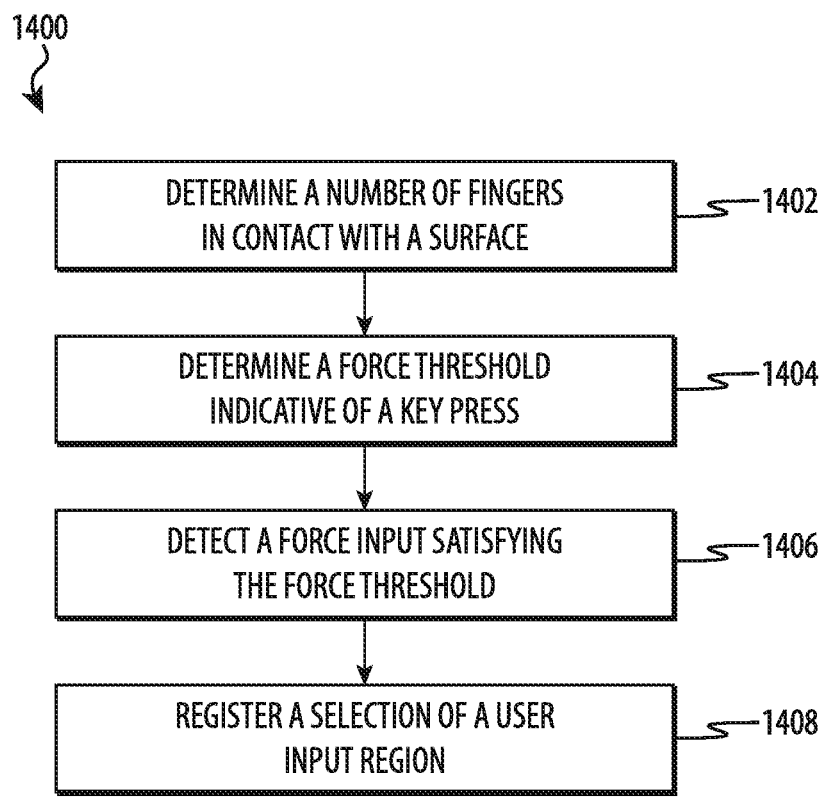
FIG. 14 depicts an example process of detecting a key press.

FIG. 14 depicts an example process 1400 for detecting a key press on an input surface of an electronic device. The process 1400 may be implemented on any of the example devices discussed herein. The process 1400 may be used, for example, to determine what actions (if any) the electronic device should perform in response to the force input, and may be implemented using, for example, the processing unit and other hardware elements described with respect to FIG. 20. The process 1400 may be implemented as processor-executable instructions that are stored within the memory of the electronic device.

In operation 1402, a number of fingers in contact with an input surface of an electronic device (e.g., the surface of the cover 104, FIG. 1) is determined. For example, a touch sensing system of the keyboard 100 may be used to determine how many fingers are in contact with the cover 104.

In operation 1404, a force threshold indicative of a key press is determined. For example, the keyboard 100 determines a force threshold that, if satisfied, will result in the keyboard 100 registering a selection of an input region (e.g., a virtual key). The force threshold is determined based at least in part on the number of fingers in contact with the input surface. For example, the force threshold may be between about 25 and about 150 grams higher than a baseline force for the number of fingers determined to be in contact with the input surface. The baseline force for each finger in contact may be 10 grams. Thus, each additional finger in contact with the input surface may add another 10 grams to the baseline force. Other values are also possible. Also, the baseline force for each number of fingers may not increase linearly. For example, the baseline force for one finger may be 10 grams, and the baseline force for eight fingers may be 40 grams.

In operation 1406, a force input satisfying the force threshold is detected. The force input may be detected with a force sensing system, such as any of the force sensing systems described above.

In operation 1408, in response to detecting the force input at operation 1406, a selection of an input region may be registered. For example, if a force input satisfying the threshold is determined to have been applied to a location of a key, a selection of that key (which may correspond to a text character, for example), is registered. The keyboard 100 may communicate the selection to an electronic device, which may execute an appropriate action or response (such as inputting the text character into an application).

In some cases, a force threshold may instead or additionally be established based on the magnitude of detected force inputs. That is, different users may type or apply inputs to a keyboard with different forces. More particularly, a first user may type with a relative lower force for each key strike (e.g., with an average force of about 10 grams), while a second user may type with a relatively larger force for each key strike (e.g., with an average force of about 100 grams). Accordingly, the keyboard 100 may adapt to individual users by adjusting the force threshold after detecting a number of inputs. For example, the keyboard 100 may detect inputs that are indicative of typing inputs (e.g., key presses), such as inputs applied to key regions and/or inputs having frequencies or other patterns indicative of key presses, and may determine average forces of those inputs. The keyboard 100 may then adjust the force threshold based on the average forces of the key presses. Thus, if the force threshold is significantly below a user's average typing force as detected by the keyboard 100, the keyboard 100 may mistake lighter touches (that were not intended as key presses) as key presses. On the other hand, if the force threshold is significantly above a user's average typing force as detected by the keyboard 100, the keyboard 100 may not recognize all of the user's inputs as key presses. Accordingly, the keyboard 100 may dynamically set the force threshold based on an average detected force input. In some cases, the force threshold may be set to a predetermined amount below the average typing force, such as 1%, 5%, 10%, or 20% lower than the average typing force (or any other suitable value).

The average typing force may be detected at any suitable interval, such as on a time-based periodic basis (e.g., every 1 hour, every 5 hours, etc.), or on an event-based basis (e.g., every time a word-processing application is opened, every time a computer is restarted, etc.). Other intervals, periods, and triggering events are also contemplated.

A keyless keyboard may also include a touch sensing system that detects touch and/or motion-based inputs (e.g., swipes, pinches, rotations, or taps), similar to a trackpad. Accordingly, a touch input corresponding to a movement across the input surface may be detected. In response to detecting the touch input corresponding to the movement across the input surface, a position of a cursor on a display of an electronic device may be changed. The touch sensing system may share the same input surface as the keys of the keyboard, such that a user can interact with the surface of the flat keyboard in various ways, including typing (e.g., force inputs) and traditional trackpad inputs (e.g., swipes, pinches, rotations, taps, and the like).

As noted above, the keyboard 100 may include an adaptable display that can change the layout of the keys (e.g., virtual keys) on the surface of the keyboard 100. FIGS. 15A-17 illustrate example layouts and other functions that may be implemented in a keyboard 100 that includes both force sensing and haptic outputs.

For example, as described with reference to FIGS. 15A-15C, an input device 1500 may detect the location of a user's fingers 1532 and define multiple input regions according to where and how the user places his or her fingers 1532. This may improve user experience by allowing varying arrangements, sizes, and positions of the input regions (or keys) 1506.

Figure 15A:
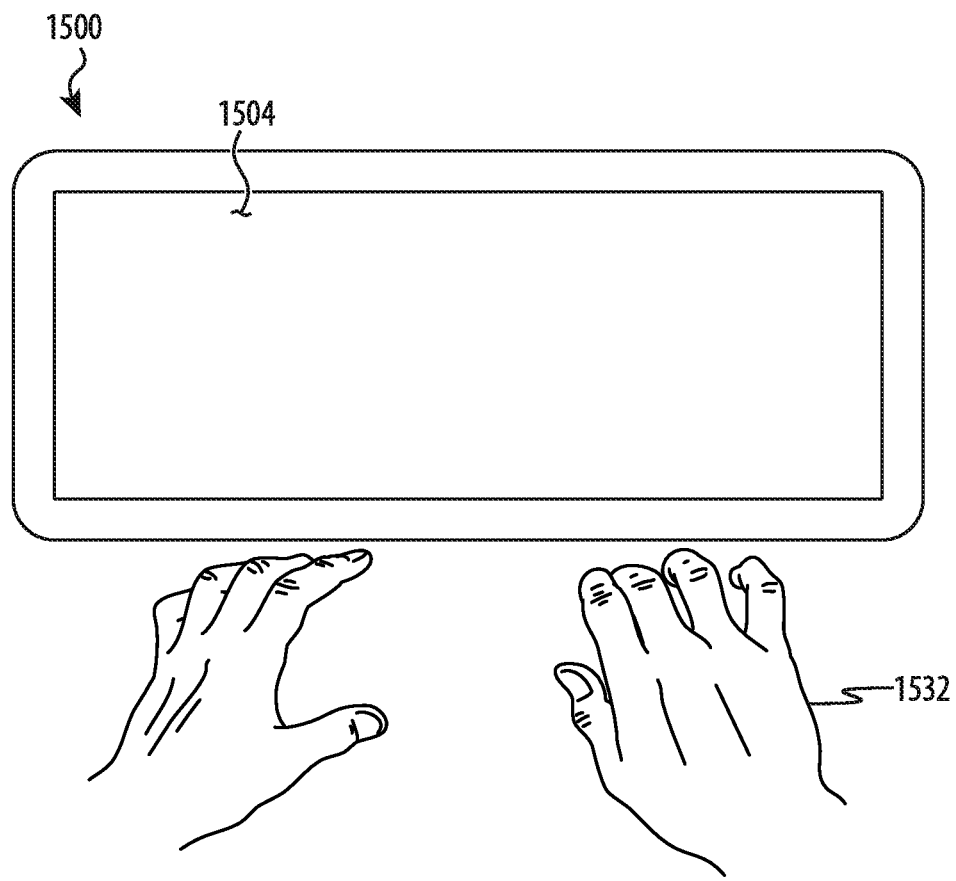
FIGS. 15A-15C depict generation of input regions according to user interaction.
Figure 15B:
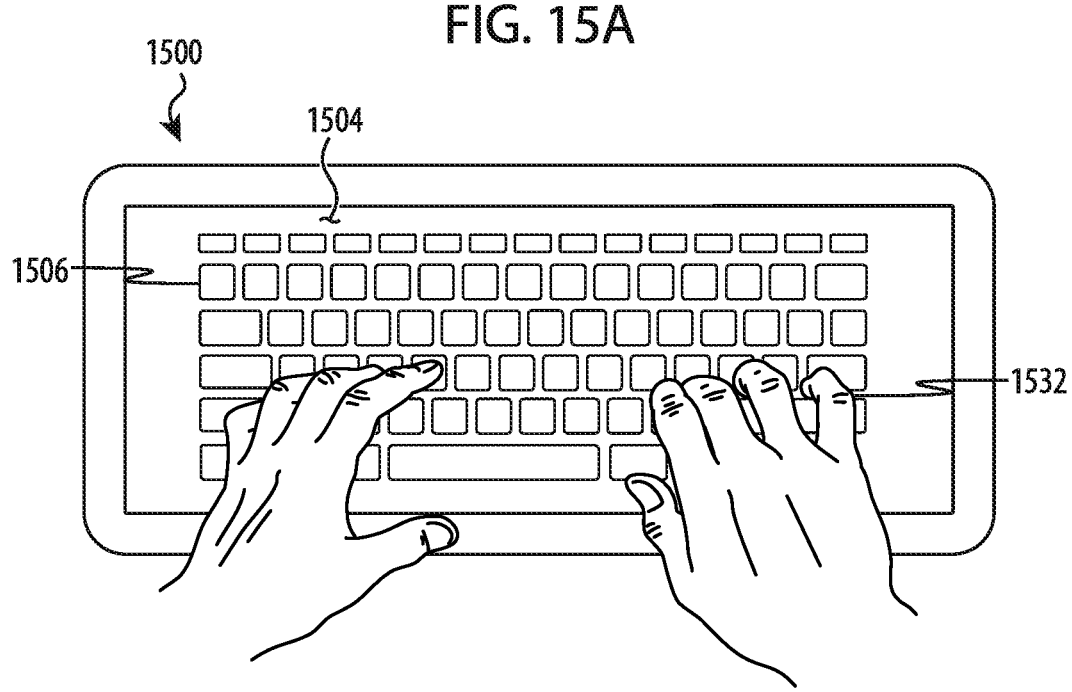

As depicted in FIG. 15A, the input surface 1504 may initially be inactive, with no defined input regions or visual indications of the input regions. As a user's fingers 1532 approach the input surface 1504, the input surface 1504 may become active as shown in FIG. 15B. For example, the input surface 1504 may incorporate proximity sensors, such as touch sensing systems, which detect the presence and/or location of the user's fingers 1532. These sensors may detect a desired location for defining the input regions 1506. The input regions 1506 may alternatively be defined in response to additional user action, such as the performance of a gesture, touching of the input surface 1504, or pressing of the input surface 1504.

In concurrence with or in response to the input regions 1506 (e.g., virtual keys) being defined on the adaptive input surface 1504, the input regions 1506 may be indicated visually. For example, a display within the input surface 1504 may visually indicate the location of the virtual keys 1506. The locations of the virtual keys 1506 may also or instead be indicated tactilely. For example, actuators (e.g., piezoelectric actuators, electrostatic elements, etc.) may provide vibrations or other outputs that may be perceived by a user as a physical boundary of the virtual keys 1506. For example, when a user places a finger directly in the center of a virtual key 1506, no haptic output may be provided. When the user moves that finger to a key boundary (or places the finger on the key boundary initially), the actuator may produce an output, thus indicating to the user that their finger is on a key boundary.

The location of the input regions and corresponding visual indicia of the input regions may further be adaptive according to user interaction. For example, the input device 1500 may further include computer-readable memory storing multiple keyboard layouts, each of which has a corresponding visual representation. The layout depicted in FIG. 15B may be a first layout (e.g., a first configuration of virtual keys), while FIG. 15C may be a second layout (e.g., a second configuration of virtual keys). Additional layouts may also be stored within the input device 1500, or may be transmitted to the input device 1500 by another computing device.

Figure 15C:
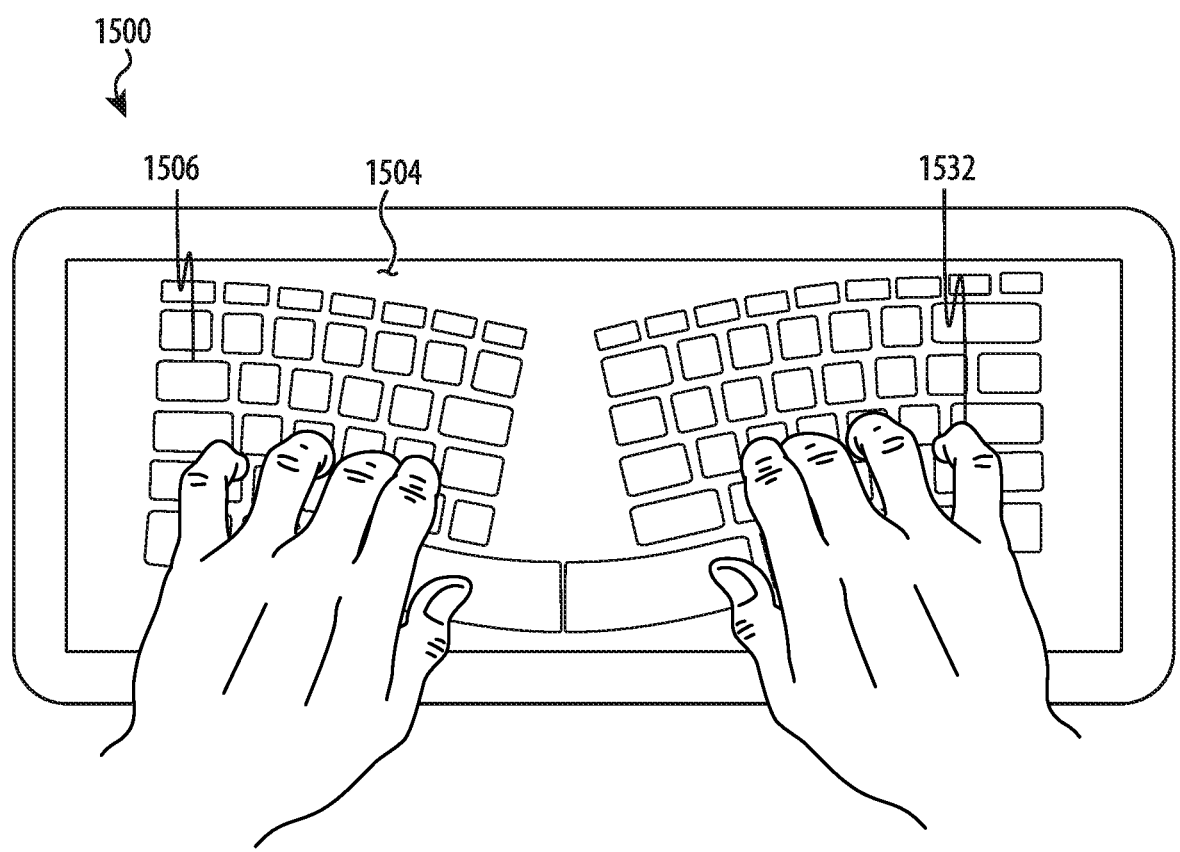

As depicted in FIG. 15C, if a user's fingers 1532 are placed in a different arrangement or location on the input device 1500, the input regions 1506 may be differently defined (e.g., according to a second keyboard layout). As illustrated in FIG. 15C, a user's fingers are placed on a previously inactive input surface at an angle to each other rather than a straight line as depicted in FIG. 15B. The input device may recognize this placement as corresponding to an ergonomic keyboard layout (e.g., a second stored keyboard layout), and define input regions 1506 and corresponding visual indicia of the input regions accordingly. These examples are illustrative in nature, and further keyboard layouts or input schemes may be implemented according to the present invention, whether due to user interaction, programmed preferences, or software controls through applications in communication with the input device.

Figure 16:
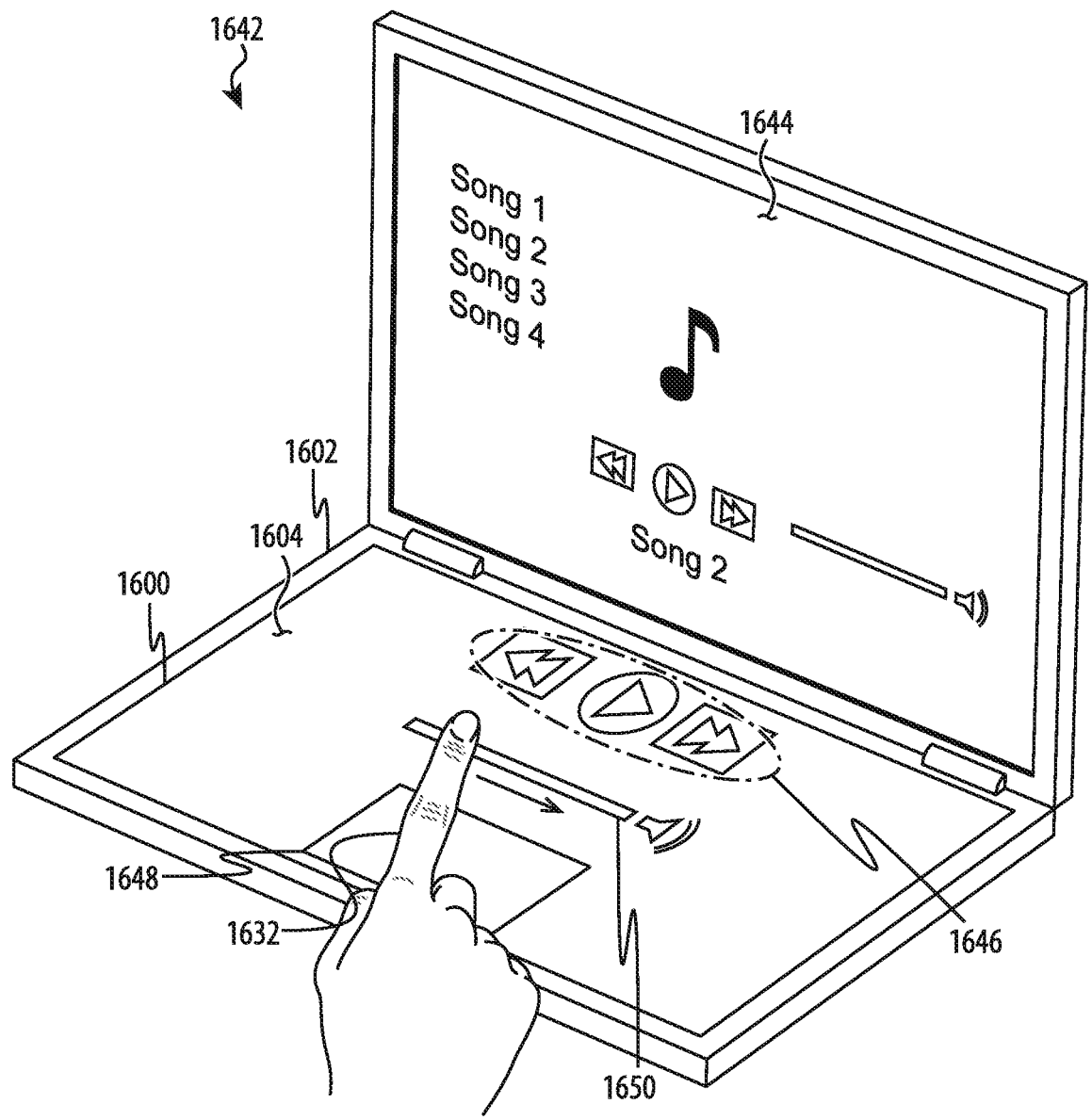
FIGS. 16-17 depict examples of software interactions with an input device with an adaptive display.

An input device that includes force sensing, haptic outputs, and an adaptive display may be used to define user interfaces other than traditional keyboards. FIG. 16 depicts an example input device 1600 incorporated within a notebook or laptop computer 1642 in which an alternative user input is produced on an adaptive input surface 1604.

The notebook computer 1642 comprises an enclosure 1602 having an upper portion with a display 1644 and a lower portion housing an input device 1600. The enclosure may further house various components, such as a processing unit (which may be shared with the processing unit of the input device 1600 or may be separate), memory, computer-readable media, input/output ports, sensors, microphones, speakers, etc. The input device 1600 may include a force sensing system, a touch sensing system, and one or more haptic actuators (not shown). Any of the force or touch sensing systems or haptic actuators described herein may be used in the input device 1600.

The input device 1600 has an adaptive input surface 1604 (which may correspond to the cover 104 in FIG. 1 or any other cover described herein). The input surface 1604 is shown adapted to interact with an active software application rendered on the display 1644 of the notebook computer 1642; here, a music player. The input surface 1604 has defined input regions, including media playback controls 1646 and a virtual trackpad 1648. The input surface 1604 also defines an input region for volume control 1650. As a user slides a finger 1632 along the volume control 1650, the touch and/or force sensing systems of the input device 1600 may detect the motion of the user's finger 1632, and the haptic actuators may be activated (e.g., caused to oscillate or vibrate the input surface 1604) and provide haptic feedback to the user. The haptic feedback may increase in intensity (e.g., frequency or amplitude) as the finger 1632 slides to increase volume, and the intensity of the haptic feedback may decrease as the finger 1632 slides to decrease volume.

Figure 17:
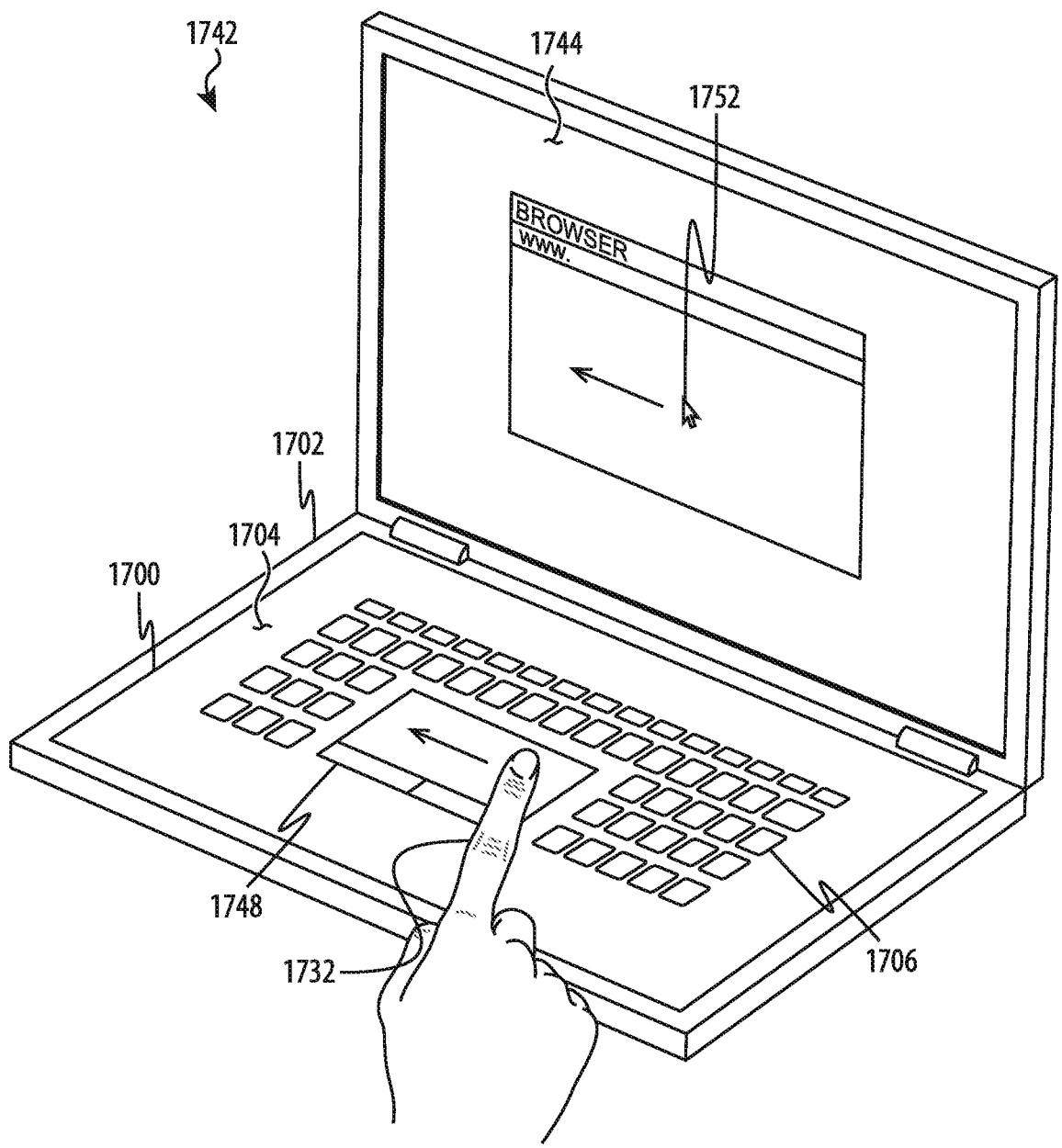

Similarly, FIG. 17 depicts an example input device 1700 incorporated within a notebook computer 1742. The notebook computer 1742 comprises an enclosure 1702 having an upper portion with a display 1744 and a lower portion housing an input device 1700 according to the present invention.

The input device 1700 has an adaptive input surface 1704 (which may correspond to the cover 104 in FIG. 1 or any other cover described herein). The input surface 1704 is shown adapted to interact with a user interface of a software application rendered on the display 1744 of the notebook computer 1742; here, a web browser. Assuming that the input surface 1704 previously defined a standard keyboard layout comprising virtual keys, as the web browser is opened the virtual keys 1706 may be shifted and/or truncated while a virtual trackpad 1748 may be repositioned to the center of the input surface 1704. With the virtual trackpad 1748 more prominently located, a user 1732 may more easily navigate web pages which may frequently require moving a pointer 1752 and clicking links.

Figure 18:
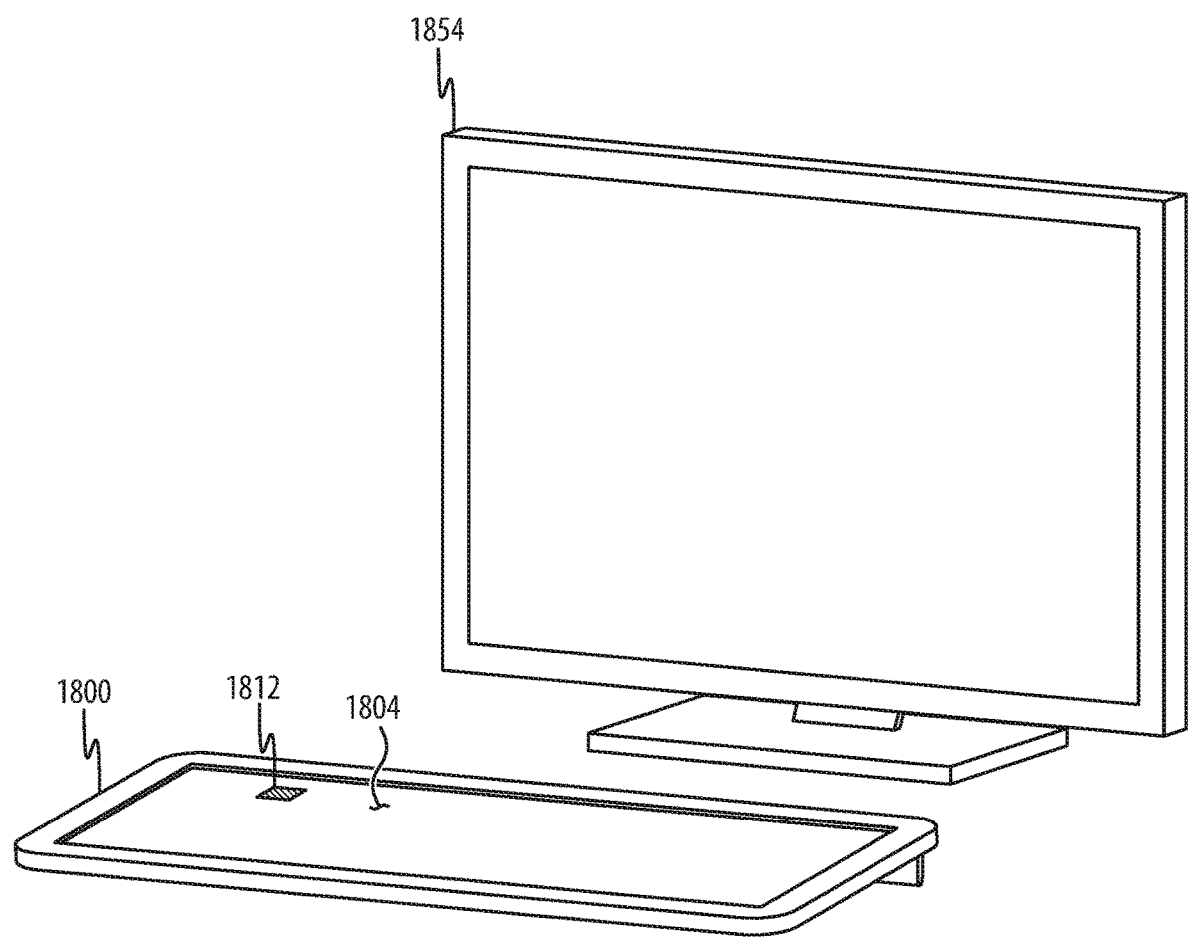
FIGS. 18-19 depict example embodiments of input devices.
Figure 19:
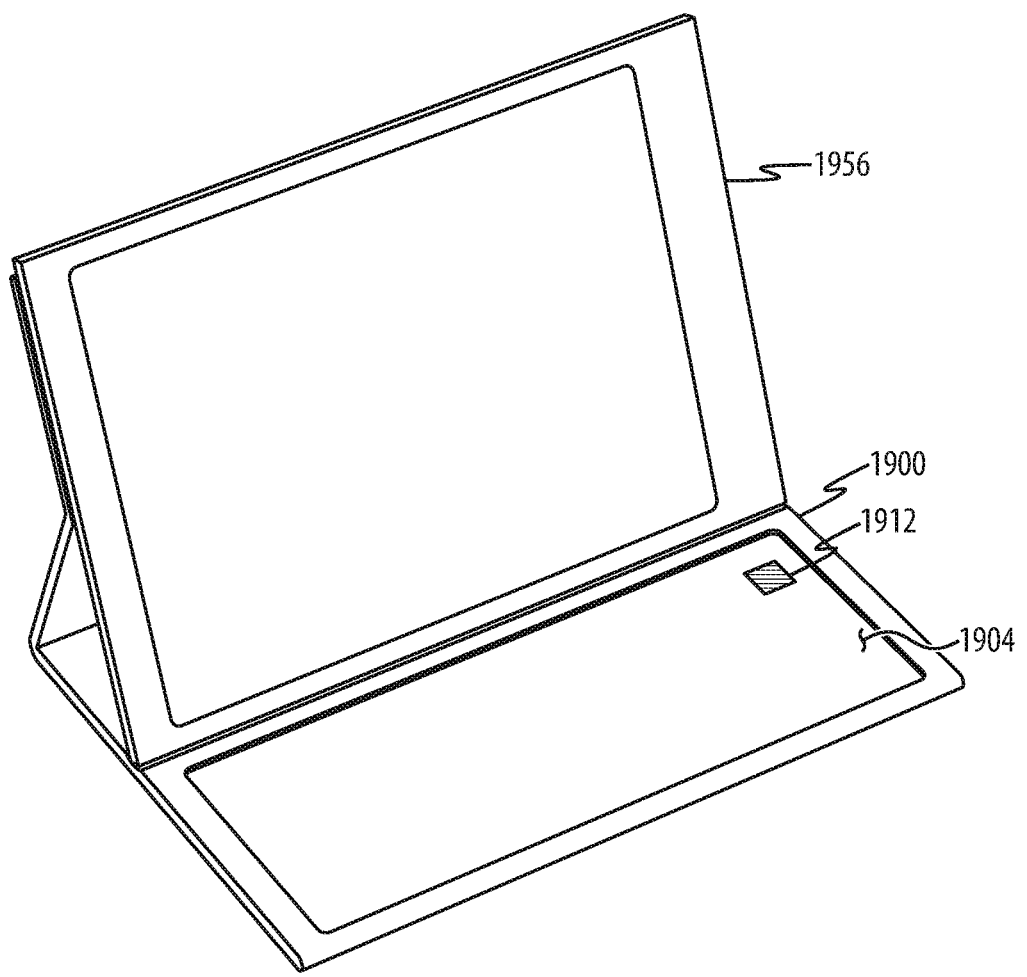

As illustrated in FIGS. 18-19, an input device according to the present invention, such as a keyless keyboard, may be implemented in many forms. Input devices may be incorporated into devices such as a notebook computer, as shown above with respect to FIGS. 16 and 17, or they may be separate devices in communication with a host computer or other device as illustrated with respect to FIGS. 18-19.

FIG. 18 depicts an example keyboard 1800 in communication with a desktop computer 1854. The keyboard 1800 may be in communication with the desktop computer 1854 through a wired or wireless connection. The keyboard 1800 has an enclosure and an adaptive input surface 1804 positioned within the enclosure. The input surface 1804 defines an input region 1812, which may correspond to a character input key. The keyboard 1800 may include force sensing systems and/or haptic actuators or haptic output systems described herein.

FIG. 19 depicts an example input device 1900 incorporated into a cover case. The cover case may be attached to and in communication with a portable tablet computing device 1956. The input device 1900 may be in communication with the tablet 1956 through a wired connection, an electrical contact connection, or a wireless connection. The input device 1900 has an adaptive input surface 1904 which defines an input region 1912. The input device 1900 may include force sensing systems and/or haptic actuators or haptic output systems described herein.

The example devices illustrated in the above figures are intended to be illustrative in nature, and can be implemented in a number of other manners. Further, while the above examples are illustrated with flat, generally smooth input surfaces, the present invention can also be implemented using curved, bent, textured, rough, and other types of surfaces.

Figure 20:
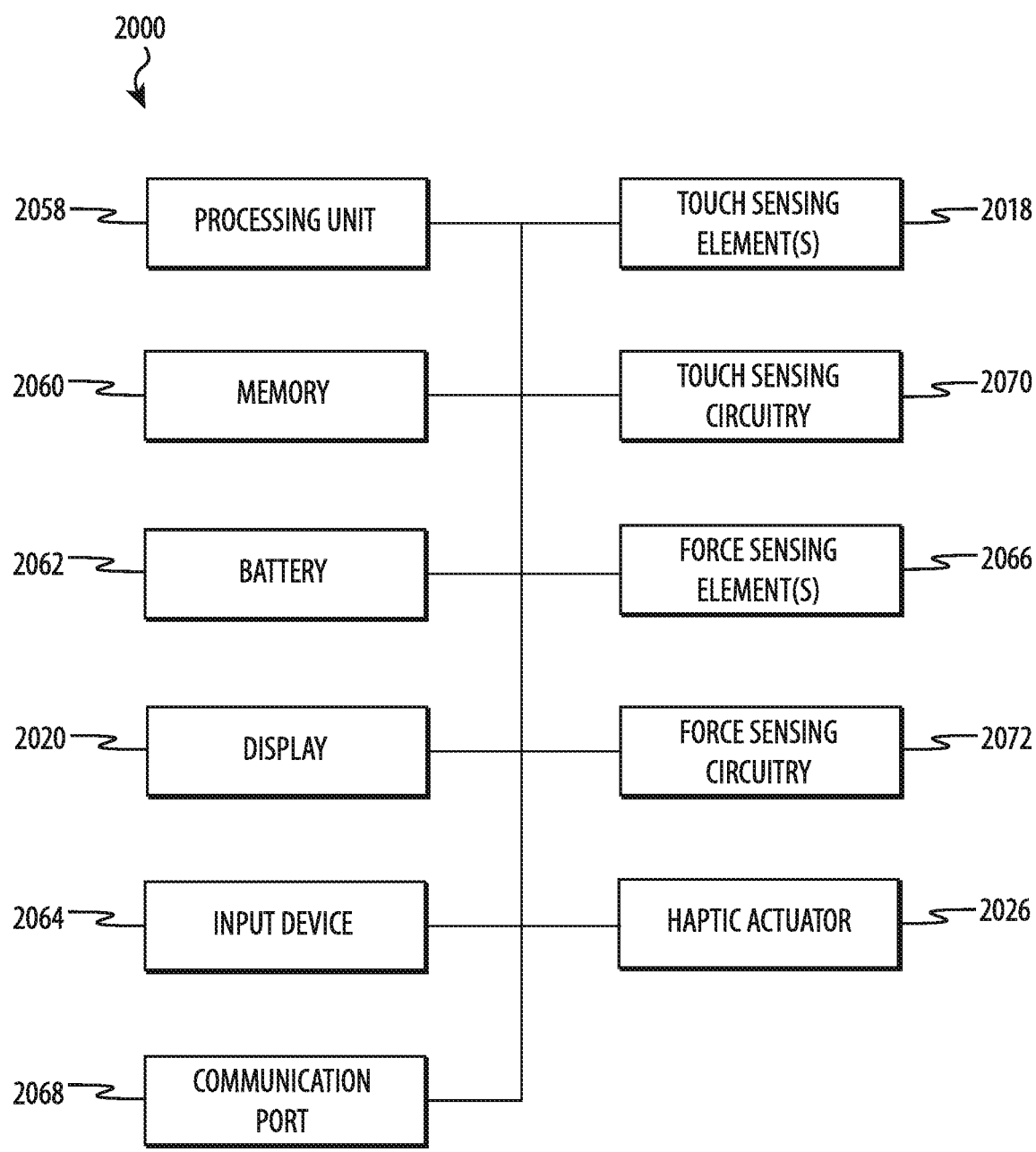
FIG. 20 depicts an example electronic device.

FIG. 20 depicts example components of an input device in accordance with the embodiments described herein. The schematic representation depicted in FIG. 20 may correspond to components of the devices depicted herein. However, FIG. 20 may also more generally represent other types of devices that include force sensing systems and controllable haptic feedback elements in accordance with the embodiments described herein.

As shown in FIG. 20, a device 2000 includes a processing unit 2058 operatively connected to computer memory 2060. The processing unit 2058 may be operatively connected to the memory 2060 component via an electronic bus or bridge. The processing unit 2058 may include one or more computer processors or microcontrollers that are configured to perform operations in response to computer-readable instructions. Where incorporated into a larger device such as a notebook computer, the processing unit 2058 may be the central processing unit (CPU) of the larger device. Additionally or alternatively, the processing unit 2058 may include other processors within the device 2000 including application specific integrated chips (ASIC) and other microcontroller devices. The processing unit 2058 may perform functionality described in the examples above.

The memory 2060 may include a variety of types of non-transitory computer-readable storage media, including, for example, read access memory (RAM), read-only memory (ROM), erasable programmable memory (e.g., EPROM and EEPROM), or flash memory. The memory 2060 is configured to store computer-readable instructions, sensor values, and other persistent software elements.

In this example, the processing unit 2058 is operable to read computer-readable instructions stored on the memory 2060. The computer-readable instructions may adapt the processing unit 2058 to perform the operations or functions described herein. The computer-readable instructions may be provided as a computer-program product, software application, or the like.

The device 2000 may also include a battery 2062 that is configured to provide electrical power to the components of the device 2000. The battery 2062 may include one or more power storage cells that are linked together to provide an internal supply of electrical power. The battery 2062 may be operatively coupled to power management circuitry that is configured to provide appropriate voltage and power levels for individual components or groups of components within the device 2000. The battery 2062, via power management circuitry, may receive power from an external source, such as an AC power outlet. The battery 2062 may store received power so that the device 2000 may operate without connection to an external power source for an extended period of time, which may range from several hours to several days.

The device 2000 may also include a display 2020 (or multiple displays 2020). The display 2020 may include a liquid crystal display (LCD), organic light emitting diode (OLED) display, electroluminescent (EL) display, electrophoretic ink (e-ink) display, or the like. If the display 2020 is an LCD or e-ink type display, the display 2020 may also include a backlight component that can be controlled to provide variable levels of display brightness. If the display 2020 is an OLED or EL type display, the brightness of the display 2020 may be controlled by modifying the electrical signals that are provided to display elements. The display 2020 may include a standalone display such as the display 1744 (FIG. 17), and/or an adaptive display of a keyboard or other input device. For example, a display 2020 may be incorporated into a keyboard to present various keyboard layouts or other user interfaces.

In some embodiments, the device 2000 includes one or more input devices 2064. The input device 2064 is a device that is configured to receive user input. The input device 2064 may include, for example, a push button, a touch-activated button, or the like. In some embodiments, the input device 2064 may provide a dedicated or primary function, including, for example, a power button, volume buttons, home buttons, scroll wheels, and camera buttons. Generally, a touch sensing system and a force sensing system may also be classified as input devices. However, for purposes of this illustrative example, the touch sensing system (touch sensing element 2018 and touch sensing circuitry 2070) and force sensing system (force sensing element 2066 and force sensing circuitry 2072) are depicted as distinct components within the device 2000.

The device 2000 may include a touch sensing system (or multiple touch sensing systems). A touch sensing system may include a touch sensing element 2018, or multiple touch sensing elements 2018, and touch sensing circuitry 2070. The touch sensing system may also include or incorporate other components of an electronic device, such as a cover or input surface of an electronic device. The touch sensing element(s) 2018 may include electrodes, electrode layers, or other components, and may be configured to operate in accordance with a mutual-capacitance or self-capacitance touch-sensing scheme, as described above. Touch sensing element(s) 2018 for other types of touch sensing schemes may additionally or alternatively be used, such as elements for surface acoustic wave sensors, resistive sensors, infrared sensors, and the like.

The device 2000 may also include touch sensing circuitry 2070. The touch sensing circuitry 2070 may be operably coupled to the touch sensing element(s) 2018 to form all or part of the touch sensing system. The touch sensing circuitry 2070, in conjunction with the touch sensing element(s) 2018, may detect and estimate the location of a touch on or near an input surface (such as an input surface of a keyless keyboard). The touch sensing circuitry 2070 may further output signals or other indicia indicating the detected location of a touch. The touch sensing circuitry 2070 may further be operably coupled to the processing unit 2058.

The device 2000 may also include a force sensing system (or multiple force sensing systems). A force sensing system may correspond to any component or group of components that detects and/or estimates an amount of force applied to an input surface. For example, a force sensing system may include a force sensing element 2066, or multiple force sensing elements 2066, and force sensing circuitry 2072. The force sensing system may also include or incorporate other components of an electronic device, such as a cover or input surface of an electronic device. Where a device includes multiple force sensing systems, each force sensing system may include its own separate components (e.g., each may have a different force sensing element and force sensing circuitry), or they may share some components (e.g., each force sensing system may each have its own force sensing element, but may share force sensing circuitry).

The force sensing element(s) 2066 may produce changes in electrical values (e.g., resistance, capacitance, voltage, etc.), detectible signals, or the like, in response to force inputs applied to the keyless keyboard (or other force-sensitive input device). The sensing element(s) 2066 may be implemented as one or more layers, such as layers of electrodes or other conductive materials. Example force sensitive elements are described above, and may include capacitive sensing elements, electrodes, piezoelectric materials, strain gauges, and the like.

The force sensing circuitry 2072 may be operably coupled to the force sensing element 2066 to form all or part of the force sensing system. The force sensing circuitry 2072, in conjunction with the force sensing element(s) 2066, may detect and estimate an amount of force applied to an input surface. In some embodiments, the force sensing circuitry 2072 may further detect a location of an applied force. The force sensing circuitry 2072 may further output signals or other indicia indicating an estimated amount of applied force. In some embodiments, the force sensing circuitry 2072 may operate using a dynamic or adjustable force threshold. The force sensing circuitry 2072 may only output signals in accordance with an applied force exceeding the force threshold. The force sensing circuitry 2072 may further be operably coupled to the processing unit 2058.

The device 2000 may also include a haptic actuator 2026 (or multiple haptic actuators 2026). The haptic actuator 2026 may be controlled by the processing unit 2058, and may provide haptic feedback to a user interacting with the device 2000, such as illustrated above with respect to FIGS. 2-6C. In some embodiments, multiple haptic actuators 2026 may provide localized macro haptic feedback at different areas of an input surface.

The device 2000 may also include a communication port 2068 that is configured to transmit and/or receive signals or electrical communication from an external or separate device. The communication port 2068 may couple to an external device via a cable, adaptor, or other type of electrical connector. In some embodiments, the communication port 2068 may be used to couple the device 2000 to a host computer. The communication port 2068 may receive control information from an external device, which may be used to operate and/or control the device 2000.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings. For example, while the methods or processes disclosed herein have been described and shown with reference to particular operations performed in a particular order, these operations may be combined, subdivided, or re-ordered to form equivalent methods or processes without departing from the teachings of the present disclosure. Moreover, structures, features, components, materials, steps, processes, or the like, that are described herein with respect to one embodiment may be omitted from that embodiment or incorporated into other embodiments.

What is claimed is:

1. A laptop computer, comprising:
an enclosure comprising:
an upper portion comprising a display; and
a lower portion comprising:
  a glass top member defining an input surface having multiple visually differentiated key regions corresponding to keys of a keyboard;
  a first force sensing system configured to detect a first force associated with a first force input applied within a first area of the glass top member that includes a first group of the multiple visually differentiated key regions typically selected by a first finger of a hand of a user, the first force input associated with a first local deformation of the glass top member, the first force sensing system comprising:

a first capacitive sense layer below the glass top member; and a first compliant member between the glass top member and the first capacitive sense layer and configured to deform in response to the first local deformation of the glass top member;

a second force sensing system configured to detect a second force associated with a second force input applied within a second area of the glass top member that includes a second group of the multiple visually differentiated key regions typically selected by a second finger of the hand of the user, the second force input associated with a second local deformation of the glass top member, the second force sensing system comprising:

a second capacitive sense layer below the glass top member; and a second compliant member between the glass top member and the second capacitive sense layer and configured to deform in response to the second local deformation of the glass top member;

a third force sensing system configured to detect a third force associated with a third force input applied within a third area of the glass top member that includes a third group of the multiple visually differentiated key regions typically selected by a third finger of the hand of the user, the third force input associated with a third local deformation of the glass top member, the third force sensing system comprising:

a third capacitive sense layer below the glass top member; and a third compliant member between the glass top member and the third capacitive sense layer and configured to deform in response to the third local deformation of the glass top member;

a touch sensing system configured to:

determine which key region from the first group of the multiple visually differentiated key regions corresponds to the first force input; and determine which key region from the second group of the multiple visually differentiated key regions corresponds to the second force input;

determine which key region from the third group of the multiple visually differentiated key regions corresponds to the third force input; and a haptic output system comprising:

a first actuator having a first actuation axis along a first direction;

a second actuator having a second actuation axis along a second direction different from the first direction; and the haptic output system alternates between actuating the first actuator and the second actuator in response to detecting successive force inputs applied to the glass top member.

2. The laptop computer of claim 1, wherein the first force sensing system is configured to determine the first force independently of the second force sensing system.

3. The laptop computer of claim 1, wherein:

the first, second, and third force sensing systems are part of a group of force sensing systems; and the group of force sensing systems defines two rows of force sensing regions on the glass top member.

4. The laptop computer of claim 3, wherein each row of the two rows of force sensing regions comprises eight force sensing regions.

5. The laptop computer of claim 1, wherein the first group of the multiple visually differentiated key regions is oriented substantially diagonally with respect to a longitudinal axis of the lower portion of the enclosure.

6. The laptop computer of claim 1, wherein:

in accordance with a determination that the first force satisfies a first force threshold, the first force sensing system registers a key input at the determined key region in the first group of the multiple visually differentiated key regions; and in accordance with a determination that the second force satisfies a second force threshold that is different from the first force threshold, the second force sensing system registers a key input at the determined key region in the second group of the multiple visually differentiated key regions.

7. A force sensing system for an electronic device, comprising:

a glass cover defining an input surface, the input surface defining multiple visually differentiated input regions each corresponding to an input key, the glass cover configured to locally deform in response to an input force applied to an input region of the multiple visually differentiated input regions;

a first force sensing system configured to detect a first force associated with a first force input applied within a first area of the glass cover that includes a first group of the multiple visually differentiated input regions typically selected by a first finger of a hand of a user, the first force input associated with a first local deformation of the glass cover, the first force sensing system comprising:

a first capacitive sense layer below the glass cover; and a first compliant member between the glass cover and the first capacitive sense layer and below the first area;

a second force sensing system configured to detect a second force associated with a second force input applied within a second area of the glass cover that includes a second group of the multiple visually differentiated input regions typically selected by a second finger of the hand of the user, the second force input associated with a second local deformation of the glass cover, the second force sensing system comprising:

a second capacitive sense layer below the glass cover; and a second compliant member between the glass cover and the second capacitive sense layer and below the second area;

a third force sensing system configured to detect a third force associated with a third force input applied within a third area of the glass cover that includes a third group of the multiple visually differentiated input regions typically selected by a third finger of the hand of the user, the third force input associated with a third local deformation of the glass cover, the third force sensing system comprising:

a third capacitive sense layer below the glass cover; and a third compliant member between the glass cover and the third capacitive sense layer and below the second area;

a processor electrically coupled to the first, second, and third capacitive sense layers and configured to:

determine which of the multiple visually differentiated input regions in the first area of the glass cover corresponds to the first force input based on which of a set of electrodes of a touch sensing system detects a contact associated with the first force input;
determine which of the multiple visually differentiated input regions in the second area of the glass cover corresponds to the second force input based on which of a set of electrodes of the touch sensing system detects a contact associated with the second force input; and
determine which of the multiple visually differentiated input regions in the third area of the glass cover corresponds to the third force input based on which of a set of electrodes of the touch sensing system detects a contact associated with the third force input; and
a haptic output system comprising:
a first actuator having a first actuation axis along a first direction; and
a second actuator having a second actuation axis along a second direction different from the first direction; and
the haptic output system alternates between actuating the first actuator and the second actuator in response to detecting successive force inputs applied to the glass cover.

8. The force sensing system of claim 7, wherein:
the force sensing system is coupled to a lower portion of an enclosure of a notebook computer and is configured as a keyboard for the notebook computer; and
the notebook computer comprises a display coupled to an upper portion of the enclosure.

9. The force sensing system of claim 8, wherein the force sensing system is configured to differentiate between force inputs having centroids about 3.0 cm apart or less.

10. The force sensing system of claim 8, wherein:
the glass cover has an elastic modulus in a range of about 60 GPa to about 80 GPa;
the glass cover has a thickness in a range of about 0.1 mm to about 0.5 mm; and
the first, second, and third compliant members have a thickness in a range of about 0.5 mm to about 2.0 mm.

11. The force sensing system of claim 10, wherein the first, second, and third compliant members are a foam.

12. The force sensing system of claim 7, wherein:
the first, second, and third force sensing systems are part of a group of force sensing systems; and
the group of force sensing systems defines two rows of force sensing regions on the glass cover.

13. The force sensing system of claim 7, wherein:
the first capacitive sense layer comprises a set of electrodes; and
each respective electrode of the set of electrodes has a respective area that is the same or smaller than a respective area of a differentiated input region in the first group of the multiple visually differentiated input regions.

14. The force sensing system of claim 7, wherein:
in accordance with a determination that the first force satisfies a first force threshold, the first force sensing system registers a key input at the determined input region in the first area; and
in accordance with a determination that the second force satisfies a second force threshold that is different from the first force threshold, the second force sensing system registers a key input at the determined input region in the second area.

15. A method of detecting a key press, the method comprising:
at a laptop computer comprising:
an upper portion comprising a display; and
a lower portion comprising a glass top member defining an input surface having multiple visually differentiated key regions corresponding to keys of a keyboard:
detecting, with a first force sensing system, a first force associated with a first force input applied within a first area of the glass top member that includes a first group of the multiple visually differentiated key regions typically selected by a first finger of a hand of a user, the first force input associated with a first local deformation of the glass top member, the first force sensing system comprising:
a first capacitive sense layer below the glass top member; and
a first compliant member between the glass top member and the first capacitive sense layer and configured to deform in response to the first local deformation of the glass top member;
detecting, with a second force sensing system, a second force associated with a second force input applied within a second area of the glass top member that includes a second group of the multiple visually differentiated key regions typically selected by a second finger of the hand of the user, the second force input associated with a second local deformation of the glass top member, the second force sensing system comprising:
a second capacitive sense layer below the glass top member; and
a second compliant member material between the glass top member and the second capacitive sense layer and configured to deform in response to the second local deformation of the glass top member;
detecting, with a third force sensing system, a third force associated with a third force input applied within a third area of the glass top member that includes a third group of the multiple visually differentiated key regions typically selected by a third finger of the hand of the user, the third force input associated with a third local deformation of the glass top member, the third force sensing system comprising:
a third capacitive sense layer below the glass top member; and
a third compliant member between the glass top member and the third capacitive sense layer and configured to deform in response to the third local deformation of the glass top member;
determining, with a touch sensing system:
which key region from the first group of the multiple visually differentiated key regions corresponds to the first force input;
which key region from the second group of the multiple visually differentiated key regions corresponds to the second force input; and
which key region from the third group of the multiple visually differentiated key regions corresponds to the third force input; and
producing haptic outputs with a haptic output system, the haptic output system comprising:
a first actuator having a first actuation axis along a first direction; and
a second actuator having a second actuation axis along a second direction different from the first direction, wherein the haptic output system alternates between actuating the first actuator and the second actuator in response to detecting successive force inputs applied to the glass top member.

16. The method of claim 15, further comprising:
in accordance with a determination that the first force satisfies a first force threshold, registering a key input at the determined key region in the first group of the multiple visually differentiated key regions; and
in accordance with a determination that the second force satisfies a second force threshold that is different from the first force threshold, registering a key input at the determined key region in the second group of the multiple visually differentiated key regions.

17. The method of claim 15, wherein the first direction is perpendicular to the second direction.

18. The laptop computer of claim 1, wherein the multiple visually differentiated key regions are tactilely differentiated.

19. The laptop computer of claim 1, wherein the first compliant member, the second compliant member, and the third compliant member are portions of a single compliant layer.

20. The laptop computer of claim 3, wherein:
the first and second force sensing systems are in a top row of the two rows; and
the third force sensing system is in a bottom row of the two rows.

21. The force sensing system of claim 7, wherein the first compliant member, the second compliant member, and the third compliant member are portions of a single compliant layer.

* * * * *